(12) United States Patent
Zhang et al.

(10) Patent No.: US 12,019,218 B2
(45) Date of Patent: Jun. 25, 2024

(54) OPTICAL IMAGING LENS GROUP

(71) Applicant: ZHEJIANG SUNNY OPTICS CO., LTD., Zhejiang (CN)

(72) Inventors: Jiaying Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 617 days.

(21) Appl. No.: 17/211,853

(22) Filed: Mar. 25, 2021

(65) Prior Publication Data

US 2021/0318522 A1    Oct. 14, 2021

(30) Foreign Application Priority Data

Apr. 14, 2020    (CN) .......................... 202010289853.7

(51) Int. Cl.
*G02B 13/00*    (2006.01)
*G02B 9/60*    (2006.01)

(52) U.S. Cl.
CPC ........... *G02B 13/0045* (2013.01); *G02B 9/60* (2013.01); *G02B 13/0065* (2013.01)

(58) Field of Classification Search
CPC .............. G02B 13/001; G02B 13/0015; G02B 13/002; G02B 13/0045; G02B 13/0055; G02B 13/0065; G02B 13/007; G02B 9/00; G02B 9/64; G02B 9/60; G02B 9/62; G02B 1/041; G02B 27/0025
USPC ....... 359/708, 713, 750, 754, 755, 763–770, 359/726, 720
See application file for complete search history.

(56) References Cited

U.S. PATENT DOCUMENTS

| | | | |
|---|---|---|---|
| 7,764,438 B2 | 7/2010 | Kamo et al. | |
| 2018/0017767 A1* | 1/2018 | Chen | .................... G02B 27/646 |
| 2018/0039049 A1 | 2/2018 | Lee et al. | |
| 2018/0059376 A1* | 3/2018 | Lin | .................... G02B 13/0045 |
| 2019/0243112 A1* | 8/2019 | Yao | ...................... H04N 23/687 |

* cited by examiner

*Primary Examiner* — Marin Pichler
(74) *Attorney, Agent, or Firm* — Samson G. Yu

(57) ABSTRACT

The disclosure discloses an optical imaging lens group, which sequentially includes from an object side to an image side along an optical axis: a first prism has a first reflective surface; a first lens has a refractive power and an object-side surface thereof is a convex surface; a second lens has a refractive power; a third lens has a refractive power, an object-side surface thereof is a concave surface and an image-side surface thereof is a convex surface; a fourth lens has a refractive power; a fifth lens has a refractive power; and a second prism has a second reflective surface. An optical distortion Dist. of the optical imaging lens group satisfies: |Dist.|<0.1%.

18 Claims, 17 Drawing Sheets

OPTICAL IMAGING LENS GROUP

CROSS-REFERENCE TO RELATED APPLICATION(S)

The disclosure claims priority to and the benefit of Chinese Patent Application No. 202010289853.7, filed in the China National Intellectual Property Administration (CNIPA) on 14 Apr. 2020, which is incorporated herein by reference in its entirety.

TECHNICAL FIELD

The disclosure relates to the field of optical elements, and particularly, the disclosure relates to an optical imaging lens group.

BACKGROUND

When electronic products develop vigorously, the application range of camera lenses has been increasingly wider. One aspect, with the electronic product gradually becoming lighter and thinner, its camera lens not only needs good image quality, but also needs to have lightness and thinness features, which can effectively reduce the product cost and better meets the humanized design. Another aspect, people put forward higher requirements on the image quality of an object photographed by the camera lens of the electronic product. Meanwhile, along with the advancement of a semiconductor process technology, a pixel size of a photosensitive element is continuously reduced, and accordingly, a camera lens carried on a portable electronic product, for Embodiment, a mobile phone or a digital camera, gradually tends to develop in the fields of miniaturization, high pixel, etc.

How to ensure that the camera lens has the features of smaller total length, good imaging quality and smaller distortion on the basis of achieving the features of lightness, thinness, miniaturization and the like of the camera lens is one of the problems urgently required to be solved by many lens designers at present.

SUMMARY

Some embodiments of the disclosure provide such an optical imaging lens group, the optical imaging lens group sequentially includes from an object side to an image side along an optical axis: a first prism with a first reflective surface, a first lens with a refractive power, an object-side surface thereof is a convex surface; a second lens with a refractive power; a third lens with a refractive power, an object-side surface thereof is a concave surface, and an image-side surface thereof is a concave surface; a fourth lens with a refractive power; a fifth lens with a refractive power; and a second prism with a second reflective surface; and an optical distortion Dist. of the optical imaging lens group may satisfy: |Dist.|<0.1%.

In an implementation mode, at least one from the object-side surface of the first lens to the image-side surface of the fifth lens is an aspherical mirror surface.

In an implementation mode, Semi-FOV is half of a maximum field of view of the optical imaging lens group, Semi-FOV and a combined focal length f34 of the third lens and the fourth lens may satisfy: $-1.3 \text{ mm} < f34 \cdot \tan(\text{Semi-FOV}) < -0.3 \text{ mm}$.

In an implementation mode, a combined focal length f12 of the first lens and the second lens and an effective focal length f4 of the fourth lens may satisfy: $-0.7 < f4/f12 < -0.2$.

In an implementation mode, a curvature radius R1 of the object-side surface of the first lens and a total effective focal length f of the optical imaging lens group may satisfy: $0.2 < R1/f < 0.7$.

In an implementation mode, a curvature radius R9 of an object-side surface of the fifth lens, a curvature radius R10 of an image-side surface of the fifth lens, and an effective focal length f5 of the fifth lens may satisfy: $-0.7 < (R9+R10)/f5 < -0.2$.

In an implementation mode, SAG32 is a distance from an intersection point of the image-side surface of the third lens and the optical axis to an effective radius vertex of the image-side surface of the third lens on the optical axis, and SAG52 is a distance from an intersection point of the image-side surface of the fifth lens and the optical axis to an effective radius vertex of the image-side surface of the fifth lens on the optical axis, SAG32 and SAG52 may satisfy: $-1.0 < \text{SAG32}/\text{SAG52} < -0.5$.

In an implementation mode, an edge thickness ET1 of the first lens and an edge thickness ET3 of the third lens may satisfy: $0.3 < ET1/ET3 < 0.8$.

In an implementation mode, an edge thickness ET4 of the fourth lens and an edge thickness ET5 of the fifth lens may satisfy: $0.3 < ET5/(ET4+ET5) < 0.8$.

In an implementation mode, a curvature radius R5 of an object-side surface of the third lens and a curvature radius R6 of an image-side surface of the third lens may satisfy: $0.5 < R5/R6 < 1.0$.

In an implementation mode, a center thickness CT1 of the first lens on the optical axis, a center thickness CT2 of the second lens on the optical axis, a center thickness CT3 of the third lens on the optical axis, a center thickness CT4 of the fourth lens on the optical axis, and a center thickness CT5 of the fifth lens on the optical axis may satisfy: $0.5 < (CT2+CT4)/(CT1+CT3+CT5) < 1.5$.

In an implementation mode, a spacing distance T12 between the first lens and the second lens on the optical axis and a spacing distance T23 between the second lens and the third lens on the optical axis may satisfy: $0.2 < T12/T23 < 0.7$.

In an implementation mode, the fourth lens may have a positive refractive power.

In an implementation mode, the fifth lens may have a negative refractive power, an object-side surface thereof may be a convex surface, and an image-side surface thereof may be a concave surface.

Some other embodiments of the disclosure further provide such an optical imaging lens group. The optical imaging lens group sequentially includes from an object side to an image side along an optical axis: a first prism with a first reflective surface; a first lens with a refractive power; a second lens with a refractive power; a third lens with a refractive power; a fourth lens with a positive refractive power; a fifth lens with a negative refractive power, an object-side surface thereof is a convex surface, and an image-side surface thereof is a concave surface; and a second prism with a second reflective surface. An optical distortion Dist. of the optical imaging lens group satisfies: |Dist.|<0.1%.

Some embodiments of the disclosure provide an optical imaging lens group, which has at least one beneficial effect of miniaturization, ultra-small distortion, good imaging quality, etc.

BRIEF DESCRIPTION OF THE DRAWINGS

Other features, objectives, and advantages of the disclosure will become more apparent by reading the detailed description on non-limiting embodiments made with reference to the following accompanying drawings.

DETAILED DESCRIPTION OF THE EMBODIMENTS

Figure 1:
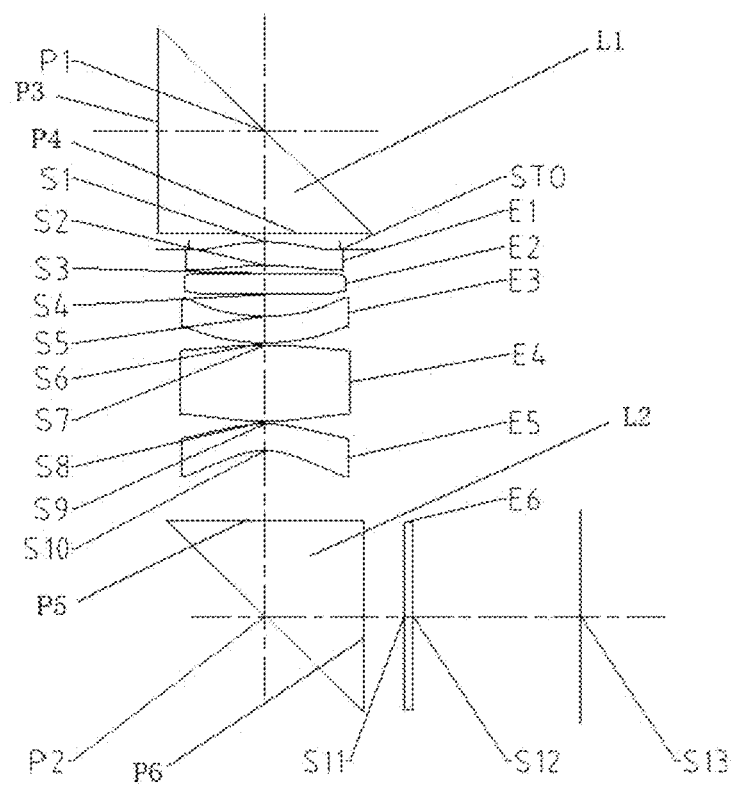
FIG. 1 shows a structural schematic diagram of an optical imaging lens group according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

The optical imaging lens group according to the exemplary embodiment of the disclosure may include two prisms and five lenses having refractive power, which are a first prism, a first lens, a second lens, a third lens, a fourth lens, a fifth lens, and a second prism. The two prisms and the five lenses are sequentially arranged along an optical axis from an object side to an image side. The first prism and the first lens may have a spacing distance therebetween. A spacing distance may be provided between any two adjacent lenses from the first lens to the fifth lens. The fifth lens and the second prism may have a spacing distance therebetween.

In an exemplary embodiment, the first prism may have a light incident surface, a first reflective surface, and a light emergent surface; the first lens may have a positive refractive power or a negative refractive power, and an object-side surface thereof may be a convex surface; a incident light may enter from the light incident surface of the first prism, and be reflected by the first reflective surface, and be emitted from the light emergent surface of the first prism to the object-side surface of the first lens; the second lens may have a positive refractive power or a negative refractive power; the third lens may have a positive refractive power or a negative refractive power, an object-side surface thereof may be a concave surface, and an image-side surface thereof may be a convex surface; the fourth lens may have a positive refractive power or a negative refractive power; the fifth lens may have a positive refractive power or a negative refractive power; the second prism may have a light incident surface, a second reflective surface and a light emergent surface; and the incident light is emitted from an image-side surface of the fifth lens enters the light incident surface of the second prism, is reflected by the second reflective surface, and is emitted from the light emergent surface of the second prism. By controlling surface types of the first lens and the third lens, it is beneficial to realize the ultra-small distortion feature of the optical imaging lens group, and improve the imaging quality of the lens.

In an exemplary embodiment, the optical imaging lens group according to the disclosure may satisfy: $|Dist.|<0.1\%$, wherein Dist. is an optical distortion of the optical imaging lens group. More specifically, Dist. may further satisfy: $|Dist.|<0.02\%$. With satisfaction of $|Dist.|<0.1\%$, a requirement for ultra-small distortion of the lens is favorably satisfied, and the aberration of a system is conducive to being reduced, which greatly improves the imaging quality of the system, and the ultra-small optical distortion may restore a real appearance of an object to the maximum extent.

In an exemplary embodiment, the optical imaging lens group according to the disclosure may satisfy: $-1.3$ mm$<f34*\tan(Semi\text{-}FOV)<-0.3$ mm, wherein f34 is a combined focal length of the third lens and the fourth lens, and Semi-FOV is half of a maximum field of view of the optical imaging lens group. More specifically, f34 and Semi-FOV may further satisfy: $-1.2$ mm$<f34*\tan(Semi\text{-}FOV)<-0.5$ mm. With satisfaction of $-1.3$ mm$<f34*\tan(Semi\text{-}FOV)<-0.3$ mm, an ultra-thin feature and an ultra-small distortion feature of the system is conducive to being achieved.

In an exemplary embodiment, the optical imaging lens group according to the disclosure may satisfy: $-0.7<f4/f12<-0.2$, wherein f12 is a combined focal length of the first lens and the second lens, and f4 is an effective focal length of the fourth lens. With satisfaction of $-0.7<f4/f12<-0.2$, the refractive power of the system may be reasonably distributed, such that positive and negative spherical differences of the front lens and the rear lens are mutually offset.

In an exemplary embodiment, the optical imaging lens group according to the disclosure may satisfy: $0.2<R1/f<0.7$, wherein R1 is a curvature radius of an object-side surface of the first lens and f is a total effective focal length of the optical imaging lens group. More specifically, R1 and f may further satisfy: $0.2<R1/f<0.6$. With satisfaction of $0.2<R1/f<0.7$, adjustment of refractive power distribution and shortening of a total length of the system are facilitated so as to achieve miniaturization of a module, and meanwhile, balance of tolerance sensitivity of the system is facilitated.

In an exemplary embodiment, the optical imaging lens group according to the disclosure may satisfy: $-0.7<(R9+R10)/f5<-0.2$, wherein R9 is a curvature radius of an object-side surface of the fifth lens, R10 is a curvature radius of an image-side surface of the fifth lens, and f5 is an effective focal length of the fifth lens. More specifically, R9, R10, and f5 may further satisfy: $-0.7<(R9+R10)/f5<-0.3$. With satisfaction of $-0.7<(R9+R10)/f5<-0.2$, better chromatic aberration correction is facilitated so as to improve the imaging quality; and meanwhile, the problem that the tolerance sensitivity of the system is increased due to over-concentration of refractive power and over-bending of the surface is averted.

In an exemplary embodiment, the optical imaging lens group according to the disclosure may satisfy: $-1.0<SAG32/SAG52<-0.5$, wherein SAG32 is a distance from an intersection point of the image-side surface of the third lens and the optical axis to an effective radius vertex of the image-side surface of the third lens on the optical axis, and SAG52 is a distance from an intersection point of the image-side surface of the fifth lens and the optical axis to an effective radius vertex of the image-side surface of the fifth lens on the optical axis. With satisfaction of $-1.0<SAG32/SAG52<-0.5$, better balance of a relation between the miniaturization of the module and a relative illuminance of an off-axis field of view is facilitated.

In an exemplary embodiment, the optical imaging lens group according to the disclosure may satisfy: $0.3<ET1/ET3<0.8$, wherein ET1 is an edge thickness of the first lens, and ET3 is an edge thickness of the third lens. More specifically, ET1 and ET3 may further satisfy: $0.4<ET1/ET3<0.8$. With satisfaction of $0.3<ET1/ET3<0.8$, space ratios of the first lens and the third lens may be reasonably controlled, which may guarantee an assembly process of the lenses, and may achieve miniaturization of the optical imaging lens group.

In an exemplary embodiment, the optical imaging lens group according to the disclosure may satisfy: $0.3<ET5/(ET4+ET5)<0.8$, wherein ET4 is an edge thickness of the fourth lens, and ET5 is an edge thickness of the fifth lens. More specifically, ET4 and ET5 may further satisfy: $0.3<ET5/(ET4+ET5)<0.7$. With satisfaction of $0.3<ET5/(ET4+ET5)<0.8$, a field curvature of the optical imaging lens group may be effectively guaranteed, and accordingly, an off-axis field of view of the optical imaging lens group may obtain good imaging quality.

In an exemplary embodiment, the optical imaging lens group according to the disclosure may satisfy: $0.5<R5/R6<1.0$, wherein R5 is a curvature radius of an object-side surface of the third lens, and R6 is a curvature radius of an image-side surface of the third lens. More specifically, R5 and R6 may further satisfy: $0.6<R5/R6<1.0$. With satisfaction of $0.5<R5/R6<1.0$, a deflection angle of light may be reduced, and accordingly, the system may better achieve deflection of a light path.

In an exemplary embodiment, the optical imaging lens group according to the disclosure may satisfy: $0.5<(CT2+CT4)/(CT1+CT3+CT5)<1.5$, wherein CT1 is a center thickness of the first lens on the optical axis, CT2 is a center thickness of the second lens on the optical axis, CT3 is a center thickness of the third lens on the optical axis, CT4 is a center thickness of the fourth lens on the optical axis, and CT5 is a center thickness of the fifth lens on the optical axis. More specifically, CT2, CT4, CT1, CT3, and CT5 may further satisfy: 0.5<(CT2+CT4)/(CT1+CT3+CT5)<1.3. With satisfaction of 0.5<(CT2+CT4)/(CT1+CT3+CT5)<1.5, the distortion contribution amount of each field of view of the system may be controlled in a rational range, thereby improving the imaging quality.

In an exemplary embodiment, the optical imaging lens group according to the disclosure may satisfy: 0.2<T12/T23<0.7, wherein T12 is a spacing distance between the first lens and the second lens on the optical axis, and T23 is a spacing distance between the second lens and the third lens on the optical axis. More specifically, T12 and T23 may further satisfy: 0.2<T12/T23<0.5. With satisfaction of 0.2<T12/T23<0.7, the field curvature contribution amount of each field of view of the system may be controlled in a reasonable range.

In an exemplary embodiment, the fourth lens may have a positive refractive power. The refractive power design of the fourth lens is favorable for making the optical imaging lens group have the ultra-thin feature.

In an exemplary embodiment, the fifth lens may have a negative refractive power, an object-side surface thereof may be a convex surface, and an image-side surface thereof may be a concave surface. The refractive power and surface type designs of the fifth lens are favorable for making the optical imaging lens group have the ultra-thin feature.

In an exemplary embodiment, the optical imaging lens group according to the disclosure further includes a diaphragm disposed between the first prism and the first lens. Optionally, the optical imaging lens group may further include an optical filter used for correcting color deviation. And the optical imaging lens group may further include a protective glass used for protecting a photosensitive element located on the imaging surface. Some embodiments of the disclosure provide an optical imaging lens group which has the features of long focus, miniaturization, ultra-small distortion, ultra-thinness, etc. The optical imaging lens group according to the above-described embodiments of the disclosure may employ a plurality of lenses, for example, the five lenses and two prisms described above. By reasonably distributing the refractive power of each lens the surface types, the center thickness of each lens, the on-axis distance between the lenses, a position of the reflective surface, the spacing distance between the prism and the lenses, etc., incident light may be effectively converged, a total length of the optical imaging lens group is reduced, the machinability of the optical imaging lens group is improved, and accordingly, the optical imaging lens group is more easy to produce and machine.

In the embodiment of the disclosure, at least one of the mirror surfaces of each lens is an aspherical mirror surface, that is, at least one mirror surface from an object-side surface of the first lens to an image-side surface of the fifth lens is an aspherical mirror surface. The aspherical lens has the features that the curvature varies continuously from a center of the lens to a periphery of the lens. Different from a spherical lens having a constant curvature from the center of the lens to the periphery of the lens, the aspherical lens has a better feature of a curvature radius and has the advantages of improving distortion aberration and astigmatism aberration. After the aspherical lens is used, aberration occurring during imaging may be eliminated as much as possible, thereby improving the imaging quality. Optionally, at least one of the object-side surface and the image-side surface of each of the first lens, the second lens, the third lens, the fourth lens and the fifth lens is an aspherical mirror surface. Optionally, both of the object-side surface and the image-side surface of each of the first lens, the second lens, the third lens, the fourth lens and the fifth lens are aspherical mirror surfaces.

However, it should be understood by those skilled in the art that the number of lenses constituting the optical imaging lens group may be varied to obtain various results and advantages described in this specification without departing from the claimed technical solution. For example, although described with five lenses as an example in an embodiment, the optical imaging lens group is not limited to including five lenses. The optical imaging lens group may also include other numbers of lenses if desired.

Specific embodiments of the optical imaging lens group that may be suitable for use in the above embodiments are described further below with reference to the accompanying drawings.

Embodiment 1

Figure 2:
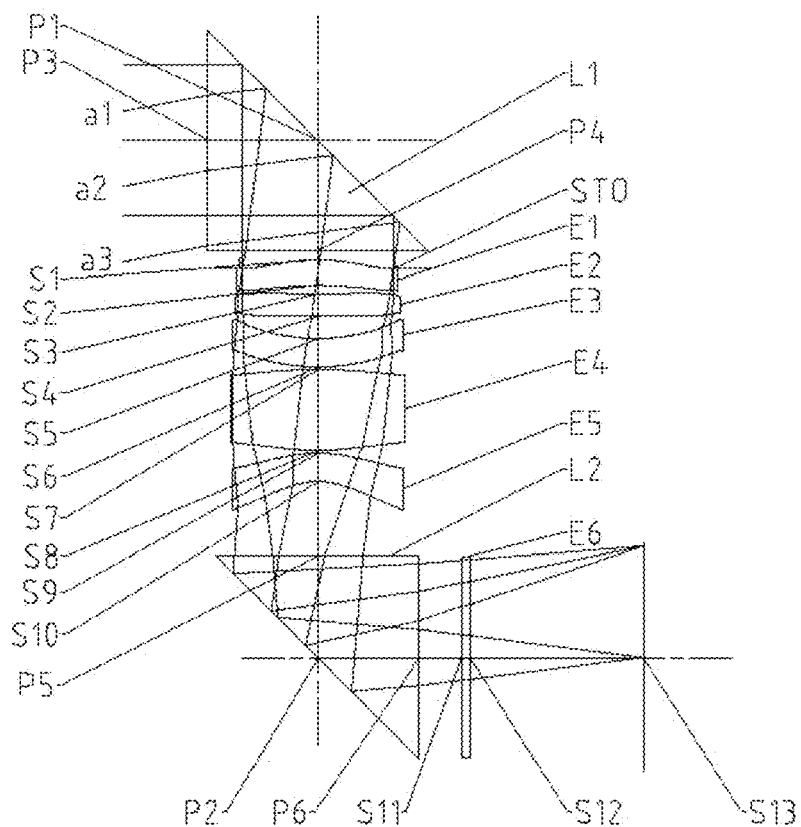
FIG. 2 shows a schematic diagram of a light path diagram of the optical imaging lens group according to Embodiment 1 of the disclosure.

An optical imaging lens group according to Embodiment 1 of the disclosure is described below with reference to FIGS. 1-3C. FIG. 1 shows a structural schematic diagram of an optical imaging lens group according to Embodiment 1 of the disclosure. FIG. 2 shows a schematic diagram of a light path diagram of the optical imaging lens group according to Embodiment 1 of the disclosure.

As shown in FIG. 1, the optical imaging lens group sequentially includes from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. As shown in FIG. 2, lights a1, a2, a3, etc. from an object sequentially passes through each of the surfaces from P3 to S12 and is finally imaged on the imaging surface S13.

Table 1 shows a table of basic parameters for the optical imaging lens group of Embodiment 1, wherein the units of the curvature radius, thickness/distance, and focal length are all millimeters (mm).

TABLE 1

| Surface number | Surface type | Curvature radius | Thickness/ distance | Material Refractive index | Abbe number | Focal length | Cone coefficient |
|---|---|---|---|---|---|---|---|
| OBJ | Spherical | Infinity | Infinity | | | | |
| P3 | Spherical | Infinity | 1.3000 | 1.52 | 64.2 | | |
| P1 | Spherical | Infinity | 1.3000 | 1.52 | 64.2 | | |
| P4 | Spherical | Infinity | 0.2079 | | | | |
| STO | Spherical | Infinity | −0.0976 | | | | |
| S1 | Aspherical | 2.1414 | 0.2952 | 1.52 | 64.2 | 14.72 | −9.4785 |
| S2 | Aspherical | 2.8404 | 0.1015 | | | | −99.0000 |
| S3 | Aspherical | −70.0000 | 0.2648 | 1.54 | 56.1 | −250.00 | 99.0000 |
| S4 | Aspherical | −144.4053 | 0.2639 | | | | 0.0000 |
| S5 | Aspherical | −2.1491 | 0.3349 | 1.52 | 64.2 | −30.15 | −0.3539 |
| S6 | Aspherical | −2.6254 | 0.0300 | | | | 0.0000 |
| S7 | Aspherical | 4.9524 | 0.9582 | 1.54 | 56.1 | 3.59 | −68.4714 |
| S8 | Aspherical | −3.0038 | 0.0300 | | | | −43.4093 |
| S9 | Aspherical | 1.4338 | 0.3373 | 1.54 | 55.6 | −4.47 | 0.0000 |
| S10 | Aspherical | 0.8231 | 0.8758 | | | | −1.0000 |
| P5 | Spherical | Infinity | 1.2000 | 1.52 | 64.2 | | |
| P2 | Spherical | Infinity | 1.2000 | 1.52 | 64.2 | | |
| P6 | Spherical | Infinity | 0.4994 | | | | |
| S11 | Spherical | Infinity | 0.1100 | 1.52 | 64.2 | | |
| S12 | Spherical | Infinity | 2.0406 | | | | |
| S13 | Spherical | Infinity | | | | | |

In the embodiment, a total effective focal length f of the optical imaging lens group is 7.02 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

In Embodiment 1, both of the object-side surface and the image-side surface of any one of the first lens E1 to the fifth lens E5 are aspherical surface, and the surface type x of each aspherical lens may be defined by, but is not limited to, the following aspherical formula:

$$x = \frac{ch^2}{1 + \sqrt{1 - (k+1)c^2h^2}} + \sum A_i h^i \quad (1)$$

wherein x is a vector height of a distance between the aspherical surface and a vertex of the aspherical surface when the aspherical surface is located at a position with the height h along the optical axis direction; c is a paraxial curvature of the aspherical surface, c=1/R (that is, the paraxial curvature c is the reciprocal of curvature radius R in Table 1 above); k is a cone coefficient; and Ai is a correction coefficient of the i-th order of the aspherical surface. Table 2 below gives higher order term coefficients $A_4, A_6, A_8, A_{10}, A_{12}, A_{14}, A_{16}, A_{13}$, and $A_{20}$ that may be used for each of the aspherical mirror surfaces S1-S10 in Embodiment 1.

TABLE 2

| Surface number | A4 | A6 | A8 | A10 | A12 |
|---|---|---|---|---|---|
| S1 | −3.0325E−02 | 7.3497E−01 | −6.0693E+00 | 2.6444E+01 | −6.6073E+01 |
| S2 | −3.1196E−01 | 5.6990E+00 | −4.3971E+01 | 1.7020E+02 | −3.7122E+02 |
| S3 | 4.1731E−02 | 3.8557E+00 | −3.9664E+01 | 1.6919E+02 | −3.9155E+02 |
| S4 | −1.2751E−01 | 1.8797E+00 | −1.5758E+01 | 7.5587E+01 | −2.0731E+02 |
| S5 | −2.0488E−01 | 6.2173E−01 | −1.1820E+00 | 8.5673E+00 | −4.1224E+01 |
| S6 | 1.9240E−01 | −2.3137E+00 | 1.3547E+01 | −4.4692E+01 | 9.0182E+01 |
| S7 | 1.6340E−01 | −2.0125E+00 | 1.1130E+01 | −3.7092E+01 | 7.9913E+01 |
| S8 | 2.0712E−01 | −1.3281E+00 | 4.8679E+00 | −1.2363E+01 | 2.2309E+01 |
| S9 | 5.1769E−01 | −1.2895E+00 | 3.9397E+00 | −9.2425E+00 | 1.5182E+01 |
| S10 | 6.2424E−01 | −8.5652E−01 | 7.5214E−01 | 9.6767E−01 | −5.6520E+00 |

| Surface number | A14 | A16 | A18 | A20 |
|---|---|---|---|---|
| S1 | 1.0237E+02 | −9.7895E+01 | 5.3106E+01 | −1.2536E+01 |
| S2 | 4.7850E+02 | −3.5979E+02 | 1.4459E+02 | −2.3728E+01 |
| S3 | 5.2683E+02 | −4.0901E+02 | 1.6808E+02 | −2.7834E+01 |
| S4 | 3.3535E+02 | −3.1764E+02 | 1.6358E+02 | −3.5520E+01 |
| S5 | 9.6550E+01 | −1.1904E+02 | 7.5197E+01 | −1.9311E+01 |
| S6 | −1.1282E+02 | 8.4760E+01 | −3.4769E+01 | 5.9179E+00 |
| S7 | −1.1072E+02 | 9.4503E+01 | −4.5007E+01 | 9.1229E+00 |
| S8 | −2.8592E+01 | 2.4593E+01 | −1.2434E+01 | 2.7351E+00 |
| S9 | −1.7621E+01 | 1.4379E+01 | −7.3326E+00 | 1.6909E+00 |
| S10 | 1.1201E+01 | −1.1710E+01 | 6.3506E+00 | −1.4105E+00 |

Figure 3A:
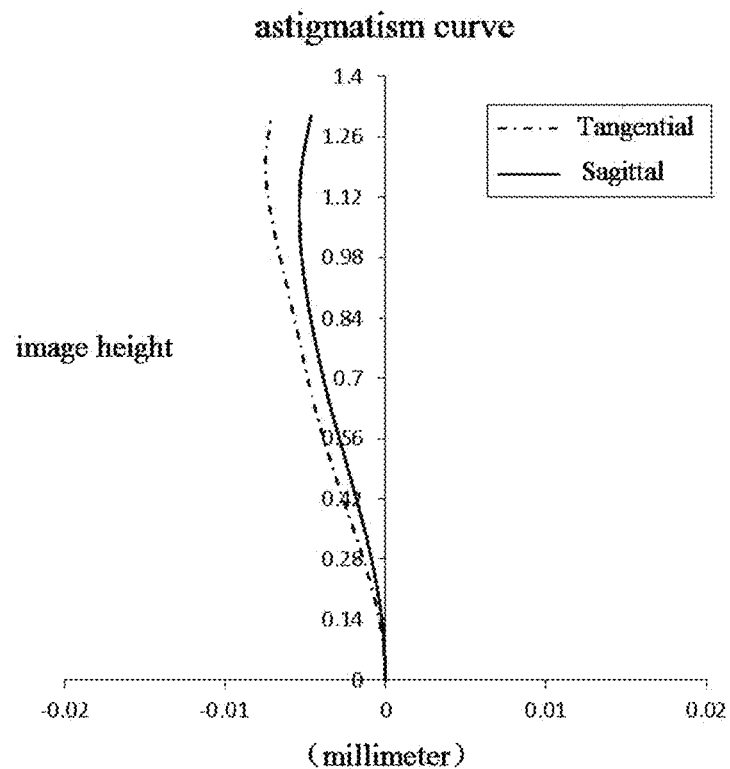
FIGS. 3A-3C show an astigmatism curve, a distortion curve, and a modulation transfer function (MTF) imaging curve of the optical imaging lens group of Embodiment 1 respectively.
Figure 3B:
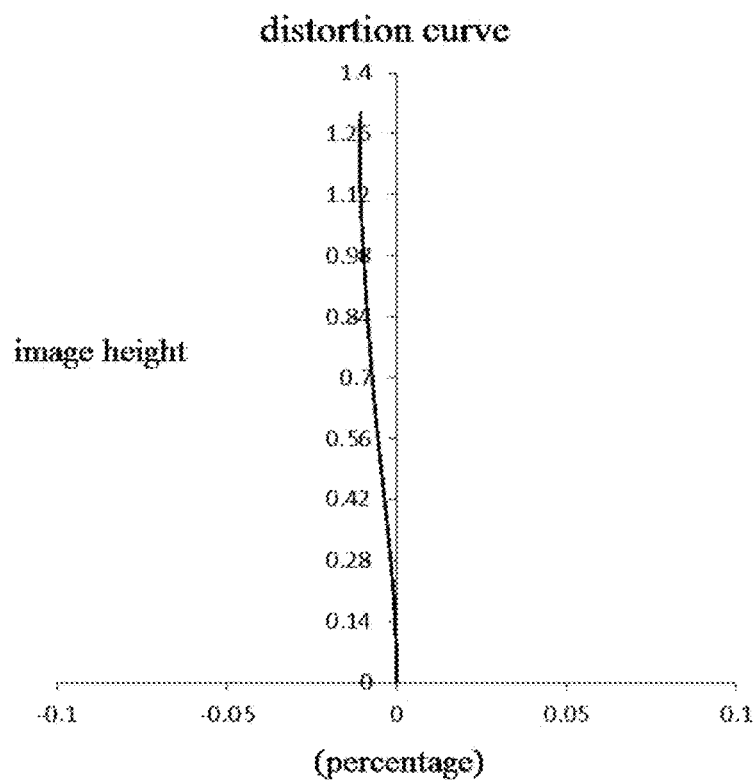
Figure 3C:
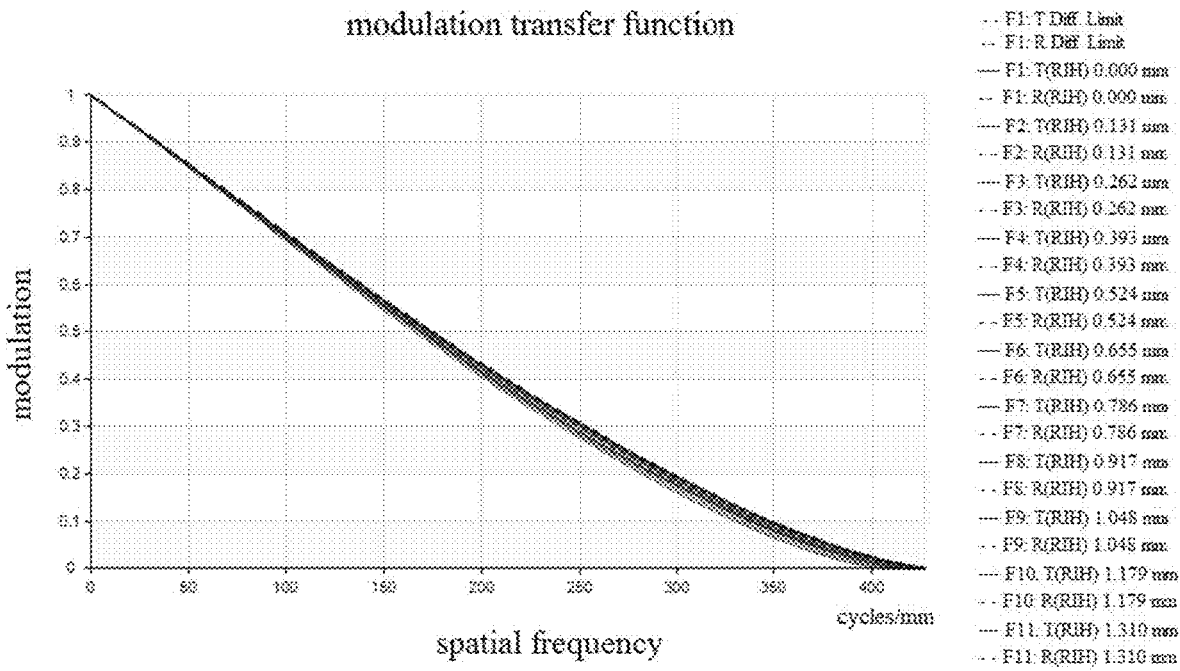

FIG. 3A shows an astigmatism curve of the optical imaging lens group of Embodiment 1, which represents a curvature of tangential image surface and a curvature of sagittal image surface. FIG. 3B shows a distortion curve of the optical imaging lens group of Embodiment 1, which represents distortion magnitude values corresponding to different image heights. FIG. 3C shows a MTF imaging curve of the optical imaging lens group of Embodiment 1, which represents a condition where a modulation degree of the optical imaging lens group varies with spatial frequency. FIGS. 3A-3C show that the optical imaging lens group given in Embodiment 1 is capable of achieving good imaging quality.

Embodiment 2

Figure 4:
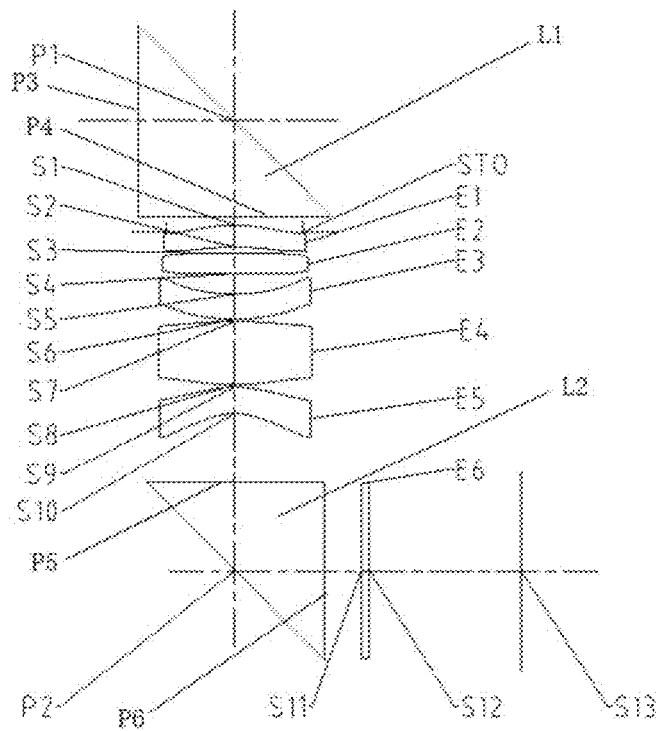
FIG. 4 shows a structural schematic diagram of an optical imaging lens group according to Embodiment 2 of the disclosure.

An optical imaging lens group according to Embodiment 2 of the disclosure is described below with reference to FIGS. 4-5C. In the present embodiment and the following embodiments, part of the description similar to Embodiment 1 will be omitted for the sake of brevity. FIG. 4 shows a structural schematic diagram of an optical imaging lens group according to Embodiment 2 of the disclosure.

As shown in FIG. 4, the optical imaging lens group sequentially includes from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.02 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 3 shows a table of basic parameters for the optical imaging lens group of Embodiment 2, wherein the units of the curvature radius, thickness/distance, and focal length are all in millimeters (mm). Table 4 shows higher order term coefficients that may be used for each aspherical mirror surface in Embodiment 2, wherein each aspherical surface type can be defined by formula (1) given in Embodiment 1 above.

TABLE 3

| Surface number | Surface type | Curvature radius | Thickness/ distance | Refractive index | Abbe number | Focal length | Cone coefficient |
|---|---|---|---|---|---|---|---|
| OBJ | Spherical | Infinity | Infinity | | | | |
| P3 | Spherical | Infinity | 1.3000 | 1.52 | 64.2 | | |
| P1 | Spherical | Infinity | 1.3000 | 1.52 | 64.2 | | |
| P4 | Spherical | Infinity | 0.2079 | | | | |
| STO | Spherical | Infinity | −0.0978 | | | | |
| S1 | Aspherical | 2.1246 | 0.2932 | 1.52 | 64.2 | 15.26 | −9.5199 |
| S2 | Aspherical | 2.7715 | 0.0933 | | | | −99.0000 |
| S3 | Aspherical | 100.0000 | 0.2644 | 1.54 | 56.1 | 4812.89 | −99.0000 |
| S4 | Aspherical | 103.8734 | 0.2758 | | | | 0.0000 |
| S3 | Aspherical | −2.1685 | 0.3361 | 1.52 | 64.2 | −22.74 | −0.3103 |
| S6 | Aspherical | −2.7997 | 0.0300 | | | | 0.0000 |
| S7 | Aspherical | 5.1042 | 0.8524 | 1.54 | 56.1 | 3.56 | −70.6847 |
| S8 | Aspherical | −2.9446 | 0.0300 | | | | −41.5851 |
| S9 | Aspherical | 1.4463 | 0.3553 | 1.54 | 55.6 | −4.67 | 0.0000 |
| S10 | Aspherical | 0.8377 | 0.9229 | | | | −1.0000 |
| P5 | Spherical | Infinity | 1.2000 | 1.52 | 64.2 | | |
| P2 | Spherical | Infinity | 1.2000 | 1.52 | 64.2 | | |
| P6 | Spherical | Infinity | 0.4997 | | | | |
| S11 | Spherical | Infinity | 0.1100 | 1.52 | 64.2 | | |
| S12 | Spherical | Infinity | 2.0403 | | | | |
| S13 | Spherical | Infinity | | | | | |

TABLE 4

| Surface number | A4 | A6 | A8 | A10 | A12 |
|---|---|---|---|---|---|
| S1 | −1.3821E−02 | 5.6240E−01 | −5.2767E+00 | 2.4216E+01 | −6.1797E+01 |
| S2 | −2.3147E−01 | 5.0175E+00 | −4.2147E+01 | 1.6933E+02 | −3.7604E+02 |
| S3 | 1.5036E−01 | 2.7879E+00 | −3.4842E+01 | 1.5612E+02 | −3.6773E+02 |
| S4 | −1.2656E−01 | 1.6835E+00 | −1.3873E+01 | 6.7836E+01 | −1.9039E+02 |
| S5 | −2.4289E−01 | 1.0607E+00 | −3.3950E+00 | 1.4858E+01 | −5.2043E+01 |
| S6 | 2.1939E−01 | −2.4013E+00 | 1.3481E+01 | −4.2646E+01 | 8.2867E+01 |
| S7 | 1.9663E−01 | −2.3378E+00 | 1.2372E+01 | −3.8926E+01 | 7.9408E+01 |
| S8 | 1.7041E−01 | −1.0094E+00 | 3.5643E+00 | −8.6176E+00 | 1.4207E+01 |
| S9 | 4.5765E−01 | −8.7339E−01 | 2.6383E+00 | −6.5855E+00 | 1.0488E+01 |
| S10 | 5.9318E−01 | −7.4805E−01 | 7.3264E−01 | −1.9271E−01 | −1.4893E+00 |

| Surface number | A14 | A16 | A18 | A20 |
|---|---|---|---|---|
| S1 | 9.6875E+01 | −9.3490E+01 | 5.1160E+01 | −1.2181E+01 |
| S2 | 4.8857E+02 | −3.6747E+02 | 1.4651E+02 | −2.3572E+01 |
| S3 | 4.9602E+02 | −3.8130E+02 | 1.5283E+02 | −2.4094E+01 |
| S4 | 3.1432E+02 | −3.0288E+02 | 1.5836E+02 | −3.4897E+01 |
| S5 | 1.0764E+02 | −1.2510E+02 | 7.6368E+01 | −1.9180E+01 |
| S6 | −1.0055E+02 | 7.3778E+01 | −2.9709E+01 | 4.9774E+00 |
| S7 | −1.0568E+02 | 8.8023E+01 | −4.1421E+01 | 8.3648E+00 |
| S8 | −1.6508E+01 | 1.3406E+01 | −6.7403E+00 | 1.5227E+00 |
| S9 | −1.0259E+01 | 6.3671E+00 | −2.5127E+00 | 5.0579E−01 |
| S10 | 4.2959E+00 | −5.6330E+00 | 3.6406E+00 | −9.3555E−01 |

Figure 5A:
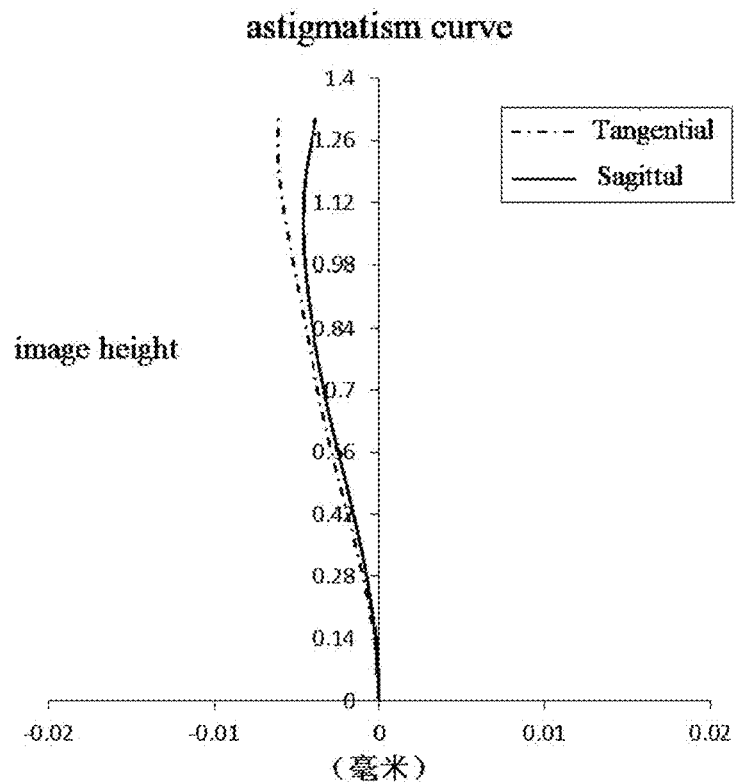
FIGS. 5A-5C show an astigmatism curve, a distortion curve, and a modulation transfer function (MTF) imaging curve of the optical imaging lens group of Embodiment 2 respectively.
Figure 5B:
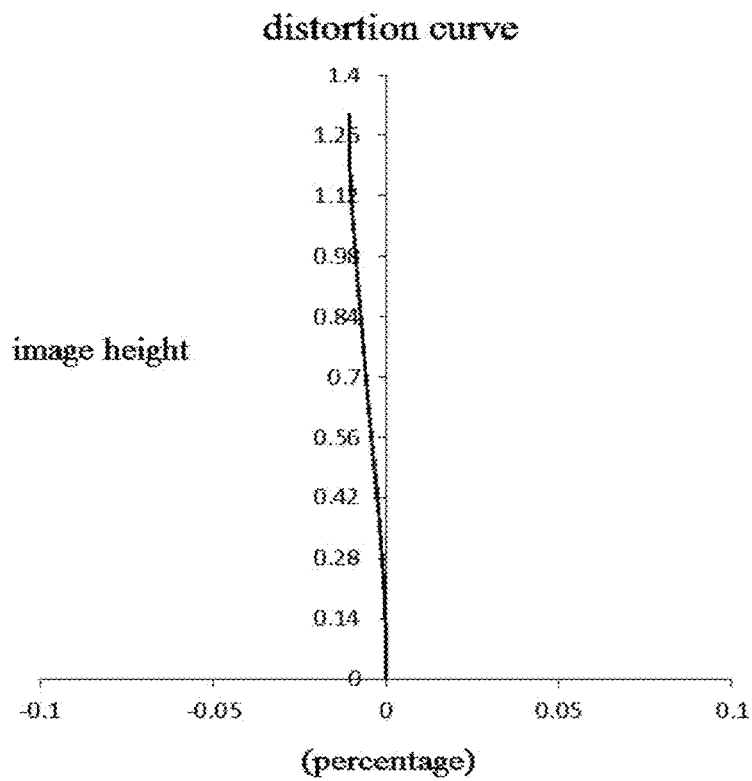
Figure 5C:
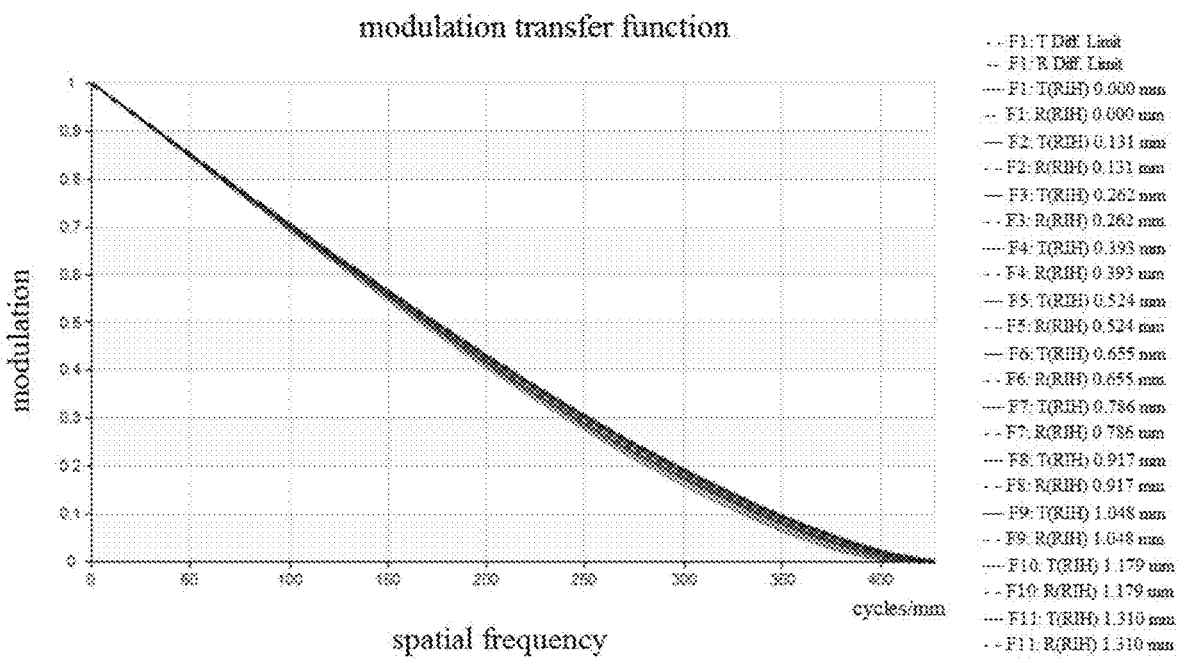

FIG. 5A shows an astigmatism curve of the optical imaging lens group of Embodiment 2, which represents a curvature of tangential image surface and a curvature of sagittal image surface. FIG. 5B shows a distortion curve of the optical imaging lens group of Embodiment 2, which represents distortion magnitude values corresponding to different image heights. FIG. 5C shows a MTF imaging curve of the optical imaging lens group of Embodiment 2, which represents a condition where a modulation degree of the optical imaging lens group varies with spatial frequency. FIGS. 5A-5C show that the optical imaging lens group given in Embodiment 2 is capable of achieving good imaging quality.

Embodiment 3

Figure 6:
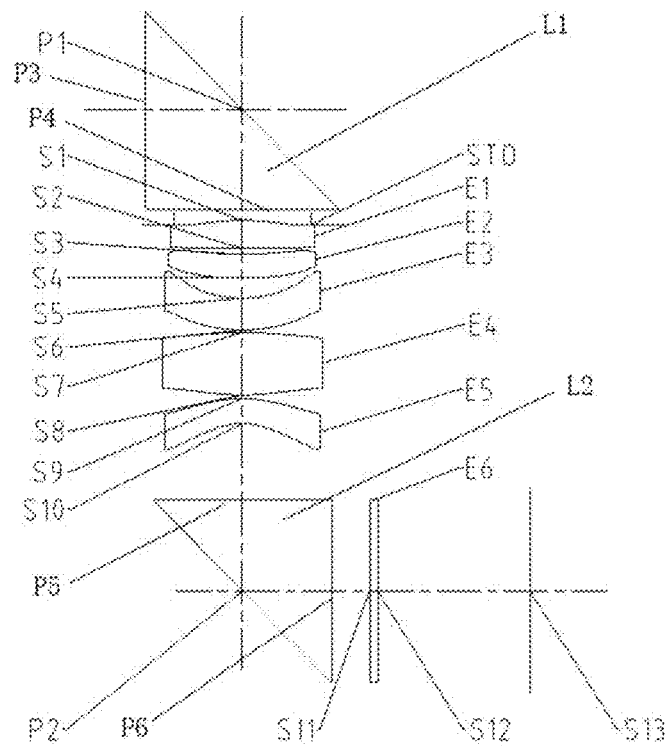
FIG. 6 shows a structural schematic diagram of an optical imaging lens group according to Embodiment 3 of the disclosure.

An optical imaging lens group according to Embodiment 3 of the disclosure is described below with reference to FIGS. 6-7C. FIG. 6 shows a structural schematic diagram of an optical imaging lens group according to Embodiment 3 of the disclosure.

As shown in FIG. 6, the optical imaging lens group sequentially includes, from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.00 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 5 shows a table of basic parameters for the optical imaging lens group of Embodiment 3, wherein the units of the curvature radius, thickness/distance, and focal length are all in millimeters (mm). Table 6 shows higher order term coefficients that may be used for each aspherical mirror surface in Embodiment 3, wherein each aspherical surface type can be defined by formula (1) given in Embodiment 1 above.

TABLE 5

| Surface number | Surface type | Curvature radius | Thickness/ distance | Material Refractive index | Abbe number | Focal length | Cone coefficient |
|---|---|---|---|---|---|---|---|
| OBJ | Spherical | Infinity | Infinity | | | | |
| P3 | Spherical | Infinity | 1.3 | 1.52 | 64.2 | | |
| P1 | Spherical | Infinity | 1.3 | 1.52 | 64.2 | | |
| P4 | Spherical | Infinity | 0.2079 | | | | |
| STO | Spherical | Infinity | −0.0589 | | | | |
| S1 | Aspherical | 3.1677 | 0.3686 | 1.52 | 64.2 | 5.95 | −12.8579 |
| S2 | Aspherical | −100 | 0.082 | | | | −82.1817 |
| S3 | Aspherical | −3.3646 | 0.3061 | 1.54 | 56.1 | −20.02 | −84.8395 |
| S4 | Aspherical | −5.024 | 0.2665 | | | | 0.0000 |
| S5 | Aspherical | −1.4544 | 0.4189 | 1.52 | 64.2 | −12.17 | −0.3306 |
| S6 | Aspherical | −2.0773 | 0.03 | | | | 0.0000 |
| S7 | Aspherical | 4.4359 | 0.8295 | 1.54 | 56.1 | 3.52 | −78.328 |
| S8 | Aspherical | −3.1498 | 0.0472 | | | | −48.8675 |
| S9 | Aspherical | 1.5565 | 0.328 | 1.54 | 55.6 | −4.27 | 0.0000 |
| S10 | Aspherical | 0.8579 | 1.0011 | | | | −1.0000 |
| P5 | Spherical | Infinity | 1.2 | 1.52 | 64.2 | | |
| P2 | Spherical | Infinity | 1.2 | 1.52 | 64.2 | | |
| P6 | Spherical | Infinity | 0.5015 | | | | |
| S11 | Spherical | Infinity | 0.11 | 1.52 | 64.2 | | |
| S12 | Spherical | Infinity | 2.0385 | | | | |
| S13 | Spherical | Infinity | | | | | |

TABLE 6

| Surface number | A4 | A6 | A8 | A10 | A12 |
|---|---|---|---|---|---|
| S1 | −2.8308E−04 | 1.5224E−01 | −1.0581E+00 | 5.6522E+00 | −1.6905E+01 |
| S2 | −1.0905E−01 | 1.2194E+00 | −8.8020E+00 | 3.5863E+01 | −8.3531E+01 |
| S3 | −3.9756E−02 | 1.2042E+00 | −1.0086E+01 | 4.1913E+01 | −9.8890E+01 |
| S4 | −1.5536E−01 | 1.5916E+00 | −7.8106E+00 | 2.7805E+01 | −6.5665E+01 |
| S5 | −2.0868E−01 | 1.1988E+00 | −5.3131E+00 | 1.9343E+01 | −4.8766E+01 |
| S6 | −1.2471E−02 | −2.6749E−02 | −5.3574E−01 | 4.0398E+00 | −1.0669E+01 |
| S7 | 1.7188E−04 | −7.8741E−02 | 4.9278E−02 | 6.0897E−01 | −1.2519E−01 |
| S8 | 1.4966E−01 | −4.6927E−01 | −1.4358E−01 | 3.4938E+00 | −8.3075E+00 |
| S9 | 3.5504E−01 | −2.1869E−01 | −2.2518E+00 | 1.1352E+01 | −2.6402E+01 |
| S10 | 5.1070E−01 | −4.8540E−01 | −9.4123E−01 | 6.8666E+00 | −1.8608E+01 |

| Surface number | A14 | A16 | A18 | A20 |
|---|---|---|---|---|
| S1 | 3.1116E+01 | −3.4634E+01 | 2.1335E+01 | −5.5992E+00 |
| S2 | 1.1461E+02 | −9.0325E+01 | 3.7040E+01 | −5.9858E+00 |
| S3 | 1.3527E+02 | −1.0370E+02 | 3.9630E+01 | −5.3609E+00 |
| S4 | 9.7004E+01 | −8.5785E+01 | 4.1739E+01 | −8.6619E+00 |
| S5 | 7.9304E+01 | −7.9286E+01 | 4.4440E+01 | −1.0727E+01 |
| S6 | 1.5117E+01 | −1.2760E+01 | 6.1675E+00 | −1.3304E+00 |
| S7 | −3.4535E+00 | 6.1986E+00 | −4.2588E+00 | 1.0638E+00 |
| S8 | 9.2208E+00 | −4.9827E+00 | 9.7485E−01 | 5.6845E−02 |
| S9 | 3.5316E+01 | −2.7649E+01 | 1.1784E+01 | −2.1158E+00 |
| S10 | 2.8977E+01 | −2.6705E+01 | 1.3524E+01 | −2.9056E+00 |

Figure 7A:
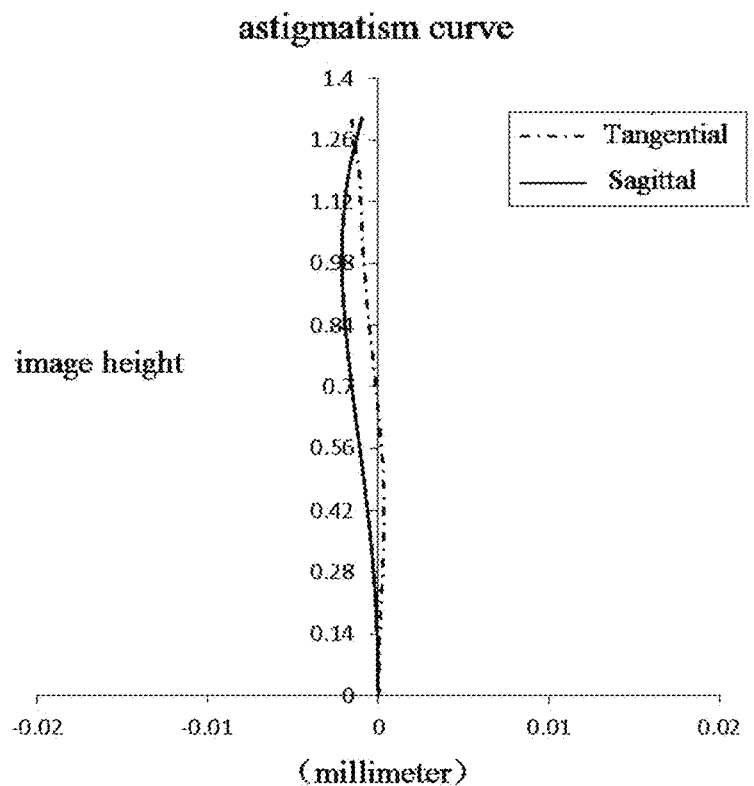
FIGS. 7A-7C show an astigmatism curve, a distortion curve, and a modulation transfer function (MTF) imaging curve of the optical imaging lens group of Embodiment 3 respectively.
Figure 7B:
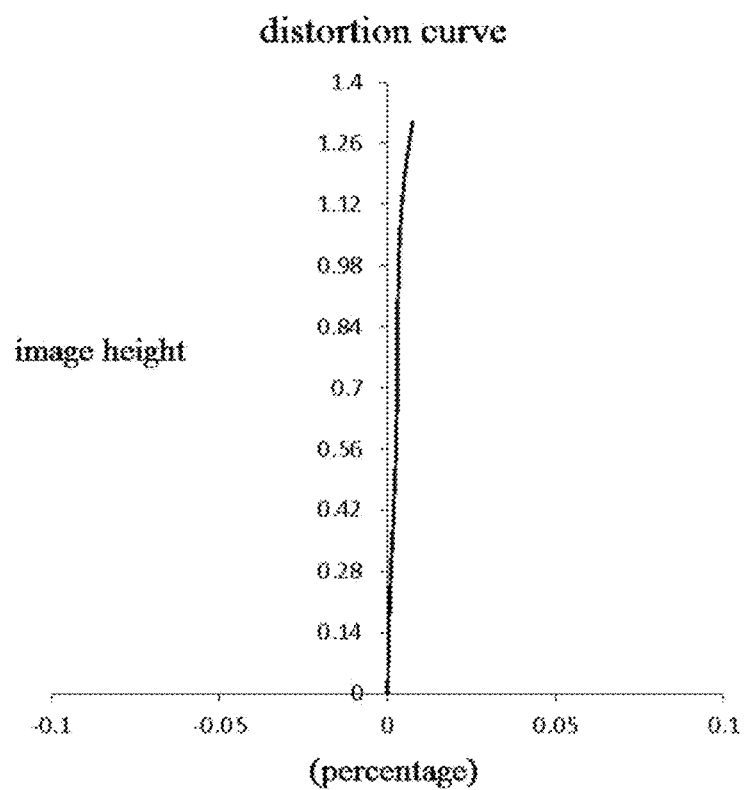
Figure 7C:
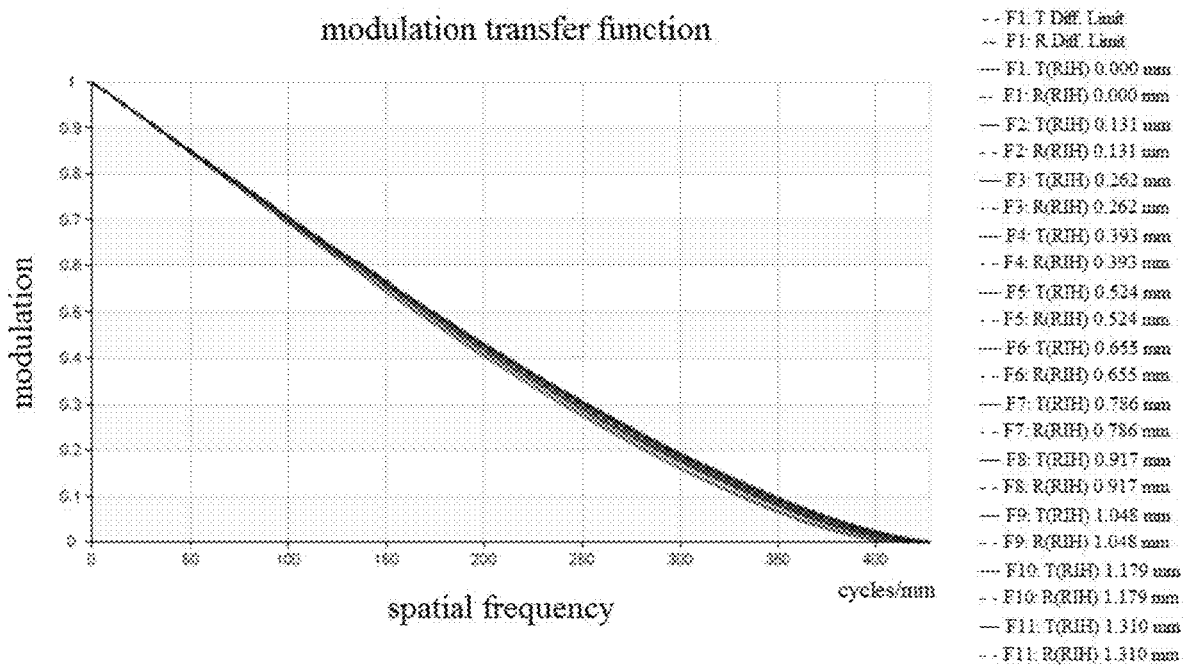

FIG. 7A shows an astigmatism curve of the optical imaging lens group of Embodiment 3, which represents a curvature of tangential image surface and a curvature of sagittal image surface. FIG. 7B shows a distortion curve of the optical imaging lens group of Embodiment 3, which represents distortion magnitude values corresponding to different image heights. FIG. 7C shows a MTF imaging curve of the optical imaging lens group of Embodiment 3, which represents a condition where a modulation degree of the optical imaging lens group varies with spatial frequency. FIGS. 7A-7C show that the optical imaging lens group given in Embodiment 3 is capable of achieving good imaging quality.

Embodiment 4

Figure 8:
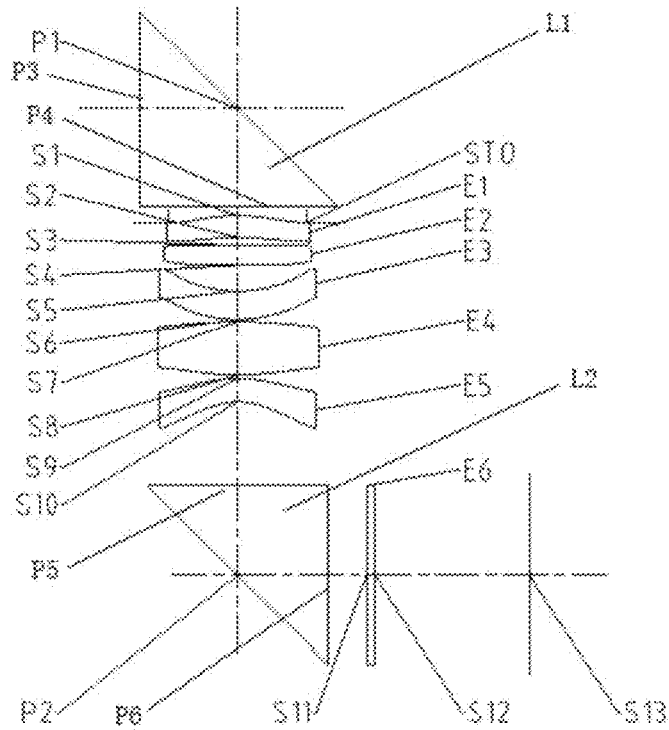
FIG. 8 shows a structural schematic diagram of an optical imaging lens group according to Embodiment 4 of the disclosure.

An optical imaging lens group according to Embodiment 4 of the disclosure is described below with reference to FIGS. 8-9C. FIG. 8 shows a structural schematic diagram of an optical imaging lens group according to Embodiment 4 of the disclosure.

As shown in FIG. 8, the optical imaging lens group sequentially includes, from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.00 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 7 shows a table of basic parameters for the optical imaging lens group of Embodiment 4, wherein the units of the curvature radius, thickness/distance, and focal length are all in millimeters (mm). Table 8 shows higher order term coefficients that may be used for each aspherical mirror surface in Embodiment 4, wherein each aspherical surface type can be defined by formula (1) given in Embodiment 1 above.

TABLE 7

| Surface number | Surface type | Curvature radius | Thickness/ distance | Refractive index | Abbe number | Focal length | Cone coefficient |
|---|---|---|---|---|---|---|---|
| OBJ | Spherical | Infinity | Infinity | | | | |
| P3 | Spherical | Infinity | 1.3000 | 1.52 | 64.2 | | |
| P1 | Spherical | Infinity | 1.3000 | 1.52 | 64.2 | | |
| P4 | Spherical | Infinity | 0.2079 | | | | |
| STO | Spherical | Infinity | −0.0881 | | | | |
| S1 | Aspherical | 2.4193 | 0.2898 | 1.52 | 64.2 | 13.29 | −9.8682 |
| S2 | Aspherical | 3.5822 | 0.1026 | | | | −79.6840 |
| S3 | Aspherical | −21.7429 | 0.2662 | 1.54 | 56.1 | −67.67 | −96.6472 |
| S4 | Aspherical | −53.3250 | 0.3429 | | | | 0.0000 |
| S5 | Aspherical | −1.6749 | 0.3760 | 1.52 | 64.2 | 100.00 | −0.3904 |
| S6 | Aspherical | −1.7464 | 0.0300 | | | | 0.0000 |
| S7 | Aspherical | 5.2843 | 0.7157 | 1.54 | 56.1 | 3.52 | −60.7295 |
| S8 | Aspherical | −2.8643 | 0.0449 | | | | −44.6474 |
| S9 | Aspherical | 1.6321 | 0.3104 | 1.54 | 55.6 | −3.72 | 0.0000 |
| S10 | Aspherical | 0.8371 | 1.0995 | | | | −1.0000 |
| P5 | Spherical | Infinity | 1.2000 | 1.52 | 64.2 | | |
| P2 | Spherical | Infinity | 1.2000 | 1.52 | 64.2 | | |
| P6 | Spherical | Infinity | 0.5014 | | | | |
| S11 | Spherical | Infinity | 0.1100 | 1.52 | 64.2 | | |
| S12 | Spherical | Infinity | 2.0385 | | | | |
| S13 | Spherical | Infinity | | | | | |

TABLE 8

| Surface number | A4 | A6 | A8 | A10 | A12 |
|---|---|---|---|---|---|
| S1 | −1.4944E−02 | 3.0163E−01 | −2.3314E+00 | 1.1159E+01 | −3.0286E+01 |
| S2 | −1.4469E−01 | 2.1415E+00 | −1.6327E+01 | 6.4937E+01 | −1.4452E+02 |
| S3 | −6.6753E−02 | 2.3086E+00 | −2.0153E+01 | 8.3542E+01 | −1.9349E+02 |
| S4 | −8.4181E−02 | 1.5618E+00 | −1.0962E+01 | 4.6315E+01 | −1.1735E+02 |
| S5 | −2.1271E−01 | 1.1226E+00 | −4.8310E+00 | 1.8184E+01 | −4.7899E+01 |
| S6 | −1.1745E−01 | 3.2254E−01 | −8.2045E−01 | 2.0880E+00 | −3.9056E+00 |
| S7 | −1.1497E−02 | −4.2794E−02 | 4.1255E−01 | −2.3775E+00 | 8.7057E+00 |
| S8 | 1.3864E−01 | −5.8179E−01 | 9.2734E−01 | −3.5844E−01 | −1.5179E−02 |
| S9 | 3.2556E−01 | −2.5353E−01 | −1.4695E+00 | 8.5308E+00 | −2.0884E+01 |
| S10 | 5.6918E−01 | −7.0379E−01 | −1.1640E−01 | 4.7371E+00 | −1.5080E+01 |

| Surface number | A14 | A16 | A18 | A20 |
|---|---|---|---|---|
| S1 | 5.0687E+01 | −5.1855E+01 | 2.9748E+01 | −7.3561E+00 |
| S2 | 1.8675E+02 | −1.3626E+02 | 4.9982E+01 | −6.5856E+00 |
| S3 | 2.6044E+02 | −1.9890E+02 | 7.7559E+01 | −1.1305E+01 |
| S4 | 1.7938E+02 | −1.6238E+02 | 8.0576E+01 | −1.7001E+01 |
| S5 | 8.0569E+01 | −8.2337E+01 | 4.6762E+01 | −1.1379E+01 |
| S6 | 5.1831E+00 | −4.9910E+00 | 3.0270E+00 | −8.2239E−01 |
| S7 | −1.7239E+01 | 1.8342E+01 | −9.9746E+00 | 2.1837E+00 |
| S8 | −2.2304E+00 | 4.8074E+00 | −3.6868E+00 | 9.9522E−01 |
| S9 | 2.8312E+01 | −2.1846E+01 | 8.9708E+00 | −1.5213E+00 |
| S10 | 2.5143E+01 | −2.3964E+01 | 1.2326E+01 | −2.6622E+00 |

Figure 9A:
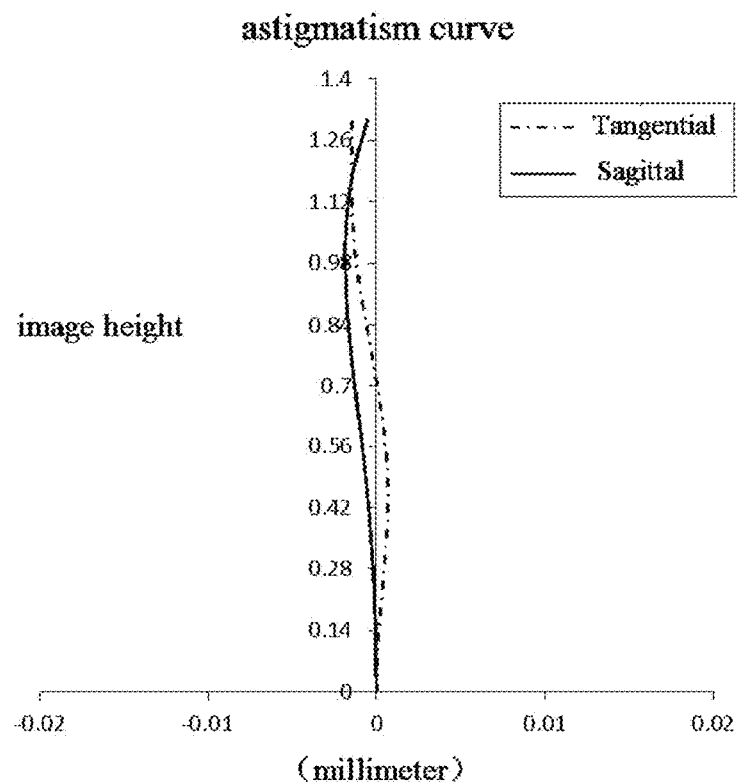
FIGS. 9A-9C show an astigmatism curve, a distortion curve, and a modulation transfer function (MTF) imaging curve of the optical imaging lens group of Embodiment 4 respectively.
Figure 9B:
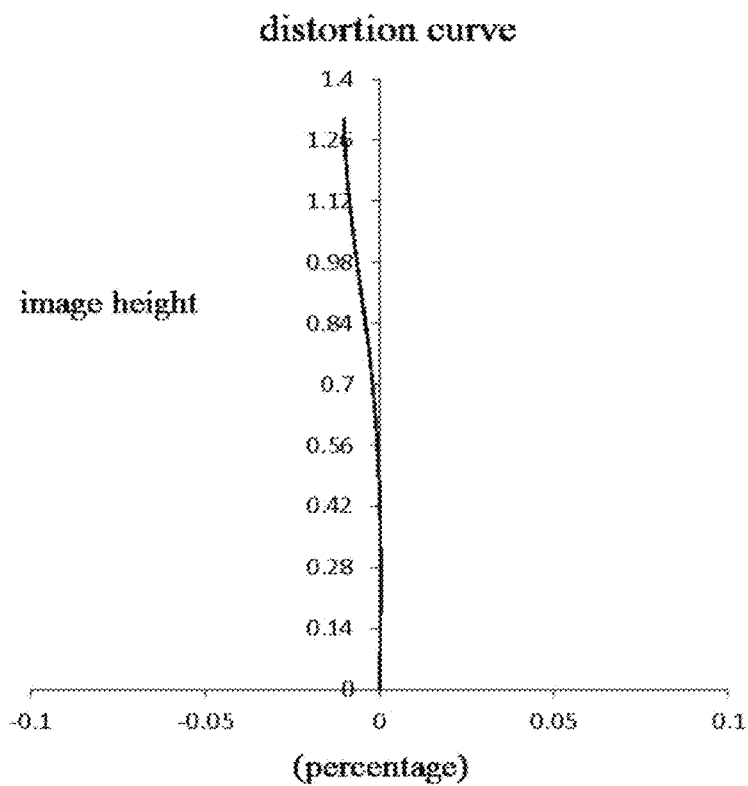
Figure 9C:
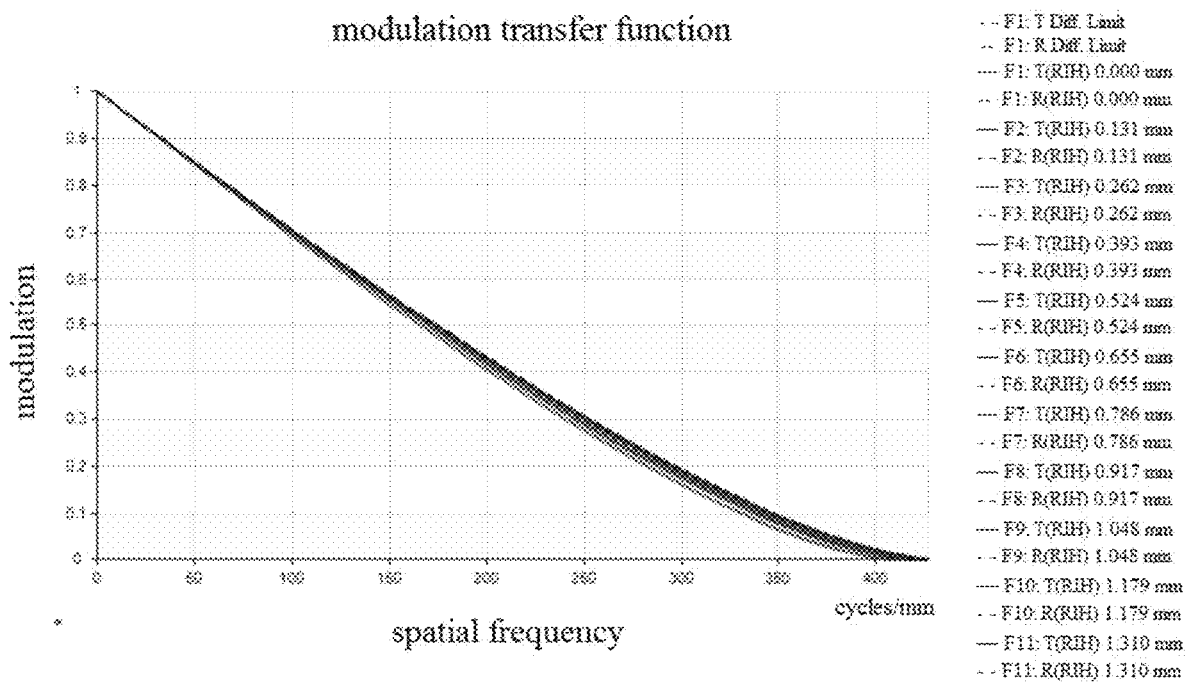

FIG. 9A shows an astigmatism curve of the optical imaging lens group of Embodiment 4, which represents a curvature of tangential image surface and a curvature of sagittal image surface. FIG. 9B shows a distortion curve of the optical imaging lens group of Embodiment 4, which represents distortion magnitude values corresponding to different image heights. FIG. 9C shows a MTF imaging curve of the optical imaging lens group of Embodiment 4, which represents a condition where a modulation degree of the optical imaging lens group varies with spatial frequency. FIGS. 9A-9C show that the optical imaging lens group given in Embodiment 4 is capable of achieving good imaging quality.

Embodiment 5

Figure 10:
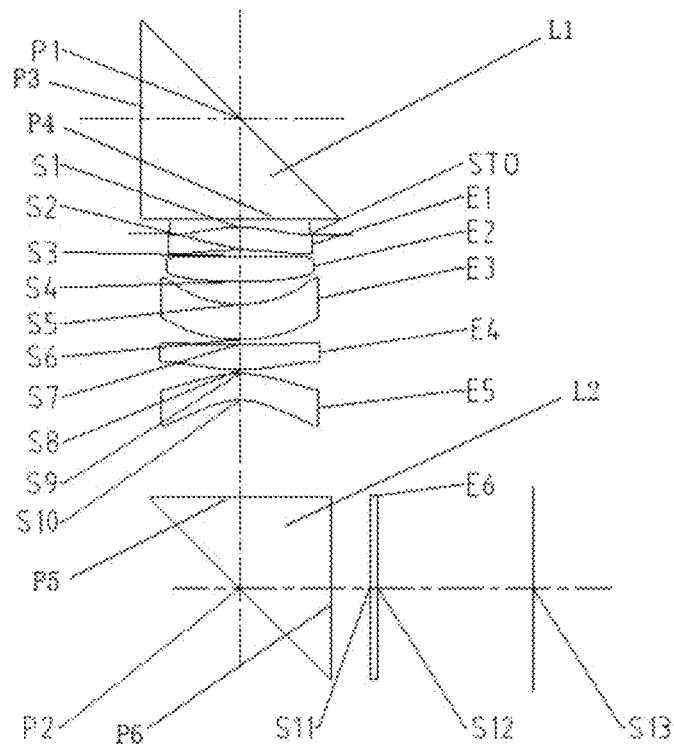
FIG. 10 shows a structural schematic diagram of an optical imaging lens group according to Embodiment 5 of the disclosure.

An optical imaging lens group according to Embodiment 5 of the disclosure is described below with reference to FIGS. 10-11C. FIG. 10 shows a structural schematic diagram of an optical imaging lens group according to Embodiment 5 of the disclosure.

As shown in FIG. 10, the optical imaging lens group sequentially includes from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.00 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 9 shows a table of basic parameters for the optical imaging lens group of Embodiment 5, wherein the units of the curvature radius, thickness/distance, and focal length are all in millimeters (mm). Table 10 shows higher order term coefficients that may be used for each aspherical mirror surface in Embodiment 5, wherein each aspherical surface type can be defined by formula (1) given in Embodiment 1 above.

TABLE 9

| Surface number | Surface type | Curvature radius | Thickness/ distance | Material Refractive index | Abbe number | Focal length | Cone coefficient |
|---|---|---|---|---|---|---|---|
| OBJ | Spherical | Infinity | Infinity | | | | |
| P3 | Spherical | Infinity | 1.3 | 1.52 | 64.2 | | |
| P1 | Spherical | Infinity | 1.3 | 1.52 | 64.2 | | |
| P4 | Spherical | Infinity | 0.2079 | | | | |
| STO | Spherical | Infinity | −0.0874 | | | | |
| S1 | Aspherical | 2.4538 | 0.292 | 1.52 | 64.2 | 13.71 | −9.8284 |
| S2 | Aspherical | 3.6009 | 0.0824 | | | | −83.6949 |
| S3 | Aspherical | −500 | 0.3291 | 1.54 | 56.1 | 17.52 | −99 |
| S4 | Aspherical | −9.3588 | 0.2995 | | | | −11.2085 |
| S5 | Aspherical | −1.5064 | 0.4656 | 1.52 | 64.2 | −26.49 | −0.2598 |
| S6 | Aspherical | −1.871 | 0.0599 | | | | −0.1944 |
| S7 | Aspherical | −100 | 0.3373 | 1.54 | 56.1 | 4.48 | 99 |
| S8 | Aspherical | −2.3828 | 0.0495 | | | | −31.9016 |
| S9 | Aspherical | 1.4479 | 0.3454 | 1.54 | 55.6 | −4.9 | −0.0036 |
| S10 | Aspherical | 0.8549 | 1.254 | | | | −1.0312 |
| P5 | Spherical | Infinity | 1.2 | 1.52 | 64.2 | | |
| P2 | Spherical | Infinity | 1.2 | 1.52 | 64.2 | | |
| P6 | Spherical | Infinity | 0.5015 | | | | |
| S11 | Spherical | Infinity | 0.11 | 1.52 | 64.2 | | |
| S12 | Spherical | Infinity | 2.0385 | | | | |
| S13 | Spherical | Infinity | | | | | |

TABLE 10

| Surface number | A4 | A6 | A8 | A10 | A12 |
|---|---|---|---|---|---|
| S1 | −1.5252E−02 | 3.1560E−01 | −2.5785E+00 | 1.2677E+01 | −3.4996E+01 |
| S2 | −1.6658E−01 | 2.5593E+00 | −2.0267E+01 | 8.3747E+01 | −1.9395E+02 |
| S3 | −6.1420E−02 | 2.3983E+00 | −2.1457E+01 | 9.0351E+01 | −2.1151E+02 |

TABLE 10-continued

| | | | | | |
|---|---|---|---|---|---|
| S4 | −5.1540E−02 | 1.4220E+00 | −9.8831E+00 | 4.1538E+01 | −1.0634E+02 |
| S5 | −1.8617E−01 | 1.2766E+00 | −6.6641E+00 | 2.6991E+01 | −7.4101E+01 |
| S6 | −1.3985E−02 | −4.2868E−01 | 2.7598E+00 | −7.7614E+00 | 1.2920E+01 |
| S7 | 8.3150E−02 | −9.7341E−01 | 5.0193E+00 | −1.5604E+01 | 3.3395E+01 |
| S8 | 1.6549E−01 | −7.0129E−01 | 1.5406E+00 | −2.6837E+00 | 5.1893E+00 |
| S9 | 2.9056E−01 | 6.3786E−02 | −1.9682E+00 | 7.8986E+00 | −1.7844E+01 |
| S10 | 5.3605E−01 | −6.2239E−01 | 9.6584E−02 | 2.4559E+00 | −7.8748E+00 |

| Surface number | A14 | A16 | A18 | A20 |
|---|---|---|---|---|
| S1 | 5.9017E+01 | −6.0553E+01 | 3.4813E+01 | −8.6303E+00 |
| S2 | 2.6175E+02 | −2.0172E+02 | 8.0447E+01 | −1.2408E+01 |
| S3 | 2.8674E+02 | −2.2001E+02 | 8.6053E+01 | −1.2560E+01 |
| S4 | 1.6611E+02 | −1.5483E+02 | 7.9521E+01 | −1.7430E+01 |
| S5 | 1.3005E+02 | −1.3902E+02 | 8.2418E+01 | −2.0798E+01 |
| S6 | −1.3088E+01 | 7.3009E+00 | 8.2418E+01 | −5.6459E−02 |
| S7 | −4.8063E+01 | 4.3115E+01 | −2.1477E+01 | 4.5102E+00 |
| S8 | −9.2138E+00 | 1.0408E+01 | −6.2076E+00 | 1.4944E+00 |
| S9 | 2.4870E+01 | −2.0959E+01 | 9.7683E+00 | −1.9272E+00 |
| S10 | 1.3396E+01 | −1.3401E+01 | 7.3692E+00 | −1.7132E+00 |

Figure 11A:
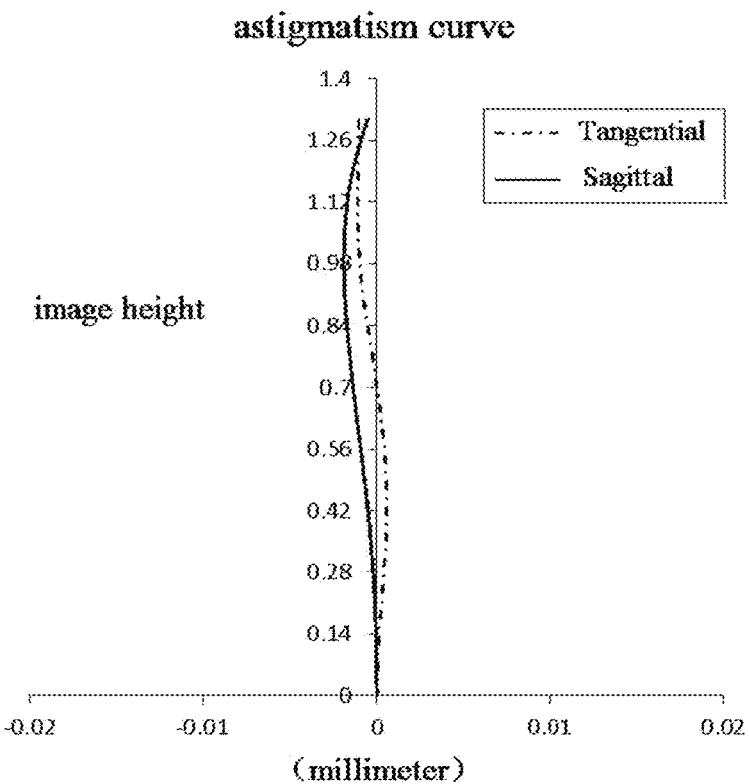
FIGS. 11A-11C show an astigmatism curve, a distortion curve, and a modulation transfer function (MTF) imaging curve of the optical imaging lens group of Embodiment 5 respectively.
Figure 11B:
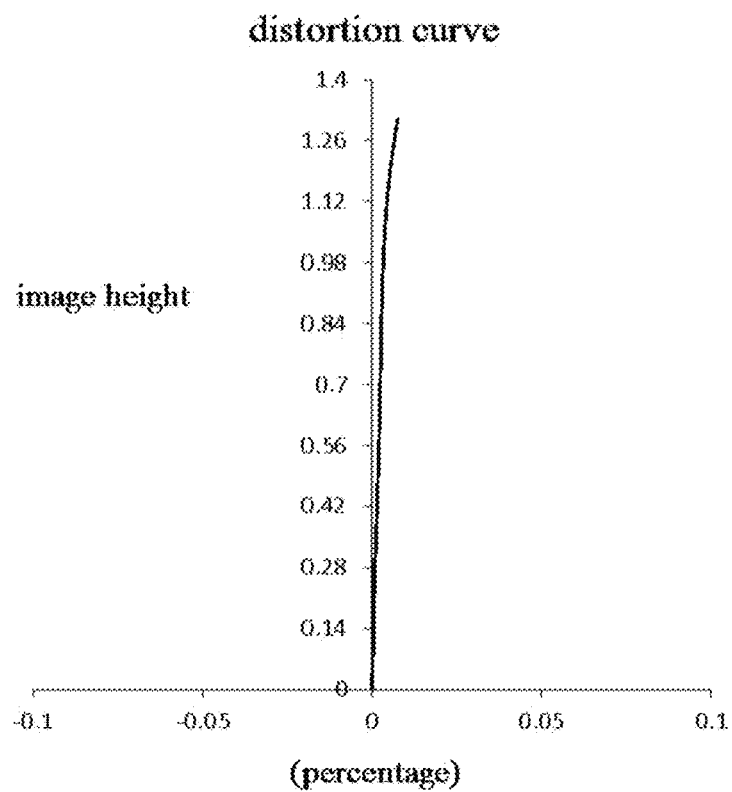
Figure 11C:
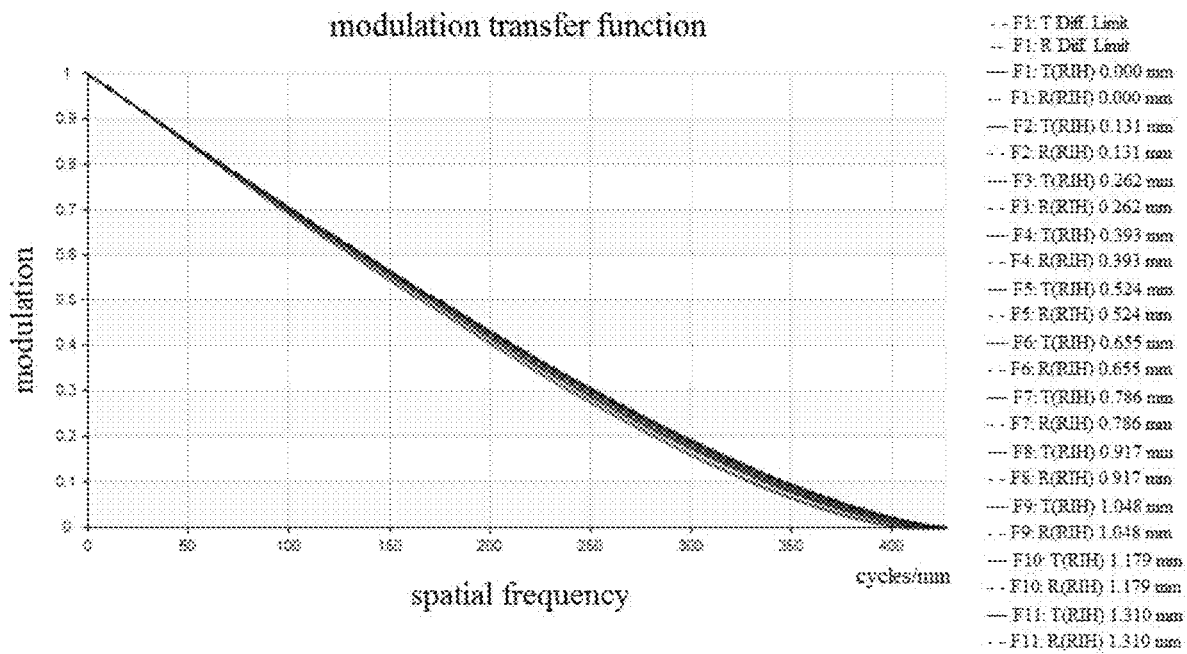

FIG. 11A shows an astigmatism curve of the optical imaging lens group of Embodiment 5, which represents a curvature of tangential image surface and a curvature of sagittal image surface. FIG. 11B shows a distortion curve of the optical imaging lens group of Embodiment 5, which represents distortion magnitude values corresponding to different image heights. FIG. 11C shows a MTF imaging curve of the optical imaging lens group of Embodiment 5, which represents a condition where a modulation degree of the optical imaging lens group varies with spatial frequency. FIGS. 11A-11C show that the optical imaging lens group given in Embodiment 5 is capable of achieving good imaging quality.

Embodiment 6

Figure 12:
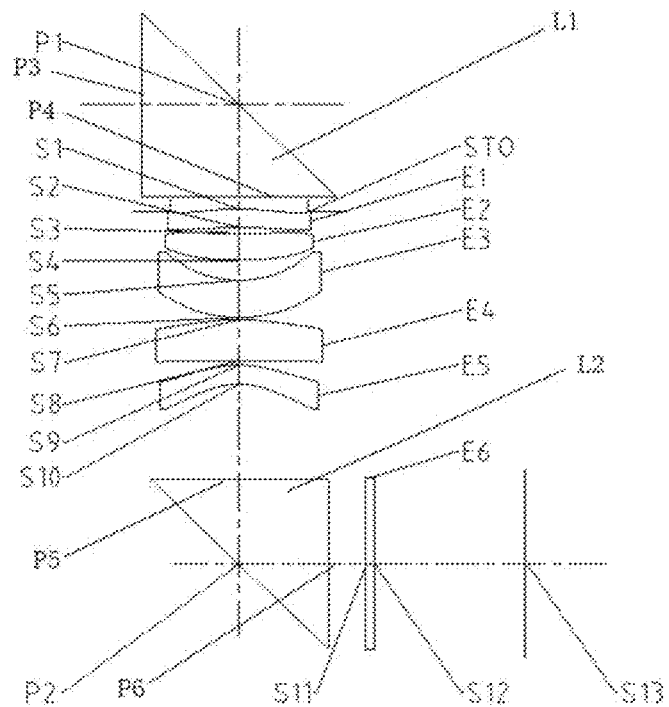
FIG. 12 shows a structural schematic diagram of an optical imaging lens group according to Embodiment 6 of the disclosure.

An optical imaging lens group according to Embodiment 6 of the disclosure is described below with reference to FIGS. 12-13C. FIG. 12 shows a structural schematic diagram of an optical imaging lens group according to Embodiment 6 of the disclosure.

As shown in FIG. 12, the optical imaging lens group sequentially includes from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.00 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 11 shows a table of basic parameters for the optical imaging lens group of Embodiment 6, wherein the units of the curvature radius, thickness/distance, and focal length are all in millimeters (mm). Table 12 shows higher order term coefficients that may be used for each aspherical mirror surface in Embodiment 6, wherein each aspherical surface type can be defined by formula (1) given in Embodiment 1 above.

TABLE 11

| | | | | Material | | | |
|---|---|---|---|---|---|---|---|
| Surface number | Surface type | Curvature radius | Thickness/ distance | Refractive index | Abbe number | Focal length | Cone coefficient |
| OBJ | Spherical | Infinity | Infinity | | | | |
| P3 | Spherical | Infinity | 1.3000 | 1.52 | 64.2 | | |
| P1 | Spherical | Infinity | 1.3000 | 1.52 | 64.2 | | |
| P4 | Spherical | Infinity | 0.2079 | | | | |
| STO | Spherical | Infinity | −0.0415 | | | | |
| S1 | Aspherical | 3.3897 | 0.2600 | 1.52 | 64.2 | 19.01 | −18.1204 |

TABLE 11-continued

| Surface number | Surface type | Curvature radius | Thickness/ distance | Material Refractive index | Abbe number | Focal length | Cone coefficient |
|---|---|---|---|---|---|---|---|
| S2 | Aspherical | 5.0406 | 0.0840 | | | | −99.0000 |
| S3 | Aspherical | −18.5788 | 0.3776 | 1.54 | 56.1 | 12.43 | −86.1399 |
| S4 | Aspherical | −4.9948 | 0.2850 | | | | 8.0603 |
| S5 | Aspherical | −1.2965 | 0.5233 | 1.52 | 64.2 | −13.32 | −0.4840 |
| S6 | Aspherical | −1.8169 | 0.0300 | | | | 0.3079 |
| S7 | Aspherical | 2.5880 | 0.5896 | 1.54 | 56.1 | 4.83 | −34.7550 |
| S8 | Aspherical | 150.0000 | 0.0600 | | | | 99.0000 |
| S9 | Aspherical | 1.3190 | 0.2678 | 1.54 | 55.6 | −6.40 | −0.1911 |
| S10 | Aspherical | 0.8848 | 1.3353 | | | | −0.9583 |
| P5 | Spherical | Infinity | 1.2000 | 1.52 | 64.2 | | |
| P2 | Spherical | Infinity | 1.2000 | 1.52 | 64.2 | | |
| P6 | Spherical | Infinity | 0.4877 | | | | |
| S11 | Spherical | Infinity | 0.1100 | 1.52 | 64.2 | | |
| S12 | Spherical | Infinity | 2.0248 | | | | |
| S13 | Spherical | Infinity | | | | | |

TABLE 12

| Surface number | A4 | A6 | A8 | A10 | A12 |
|---|---|---|---|---|---|
| S1 | 6.8782E−03 | 2.8553E−01 | −2.3273E+00 | 1.1357E+01 | −3.0680E+01 |
| S2 | −8.1219E−02 | 1.5550E+00 | −1.3435E+01 | 5.6972E+01 | −1.3071E+02 |
| S3 | −5.4243E−02 | 1.5487E+00 | −1.3835E+01 | 5.8014E+01 | −1.3323E+02 |
| S4 | 2.3084E−03 | 8.3386E−01 | −5.3948E+00 | 2.2035E+01 | −5.6217E+01 |
| S5 | −2.0386E−01 | 1.0280E+00 | −4.2456E+00 | 1.4697E+01 | −3.6811E+01 |
| S6 | 3.7255E−02 | −4.0969E−02 | −7.6159E−01 | 3.9316E+00 | −8.8543E+00 |
| S7 | −4.7179E−02 | 3.2325E−01 | −1.7940E+00 | 5.4703E+00 | −9.0423E+00 |
| S8 | 1.2130E−01 | −1.2669E−01 | −2.0459E+00 | 8.8559E+00 | −1.7675E+01 |
| S9 | 4.1794E−01 | −1.1418E−01 | −3.1002E+00 | 1.3072E+01 | −2.7867E+01 |
| S10 | 3.8283E−01 | −5.2632E−02 | −1.7902E+00 | 6.7308E+00 | −1.3798E+01 |

| Surface number | A14 | A16 | A18 | A20 |
|---|---|---|---|---|
| S1 | 5.0404E+01 | −5.0517E+01 | 2.8523E+01 | −6.9870E+00 |
| S2 | 1.7049E+02 | −1.2356E+02 | 4.4307E+01 | −5.5438E+00 |
| S3 | 1.7360E+02 | −1.2420E+02 | 4.2639E+01 | −4.5531E+00 |
| S4 | 8.7963E+01 | −8.2186E+01 | 4.2396E+01 | −9.3629E+00 |
| S5 | 6.1797E+01 | −6.4865E+01 | 3.8231E+01 | −9.6385E+00 |
| S6 | 1.1415E+01 | −8.9258E+00 | 3.9822E+00 | −7.8293E−01 |
| S7 | 8.3943E+00 | −4.2093E+00 | 9.3470E−01 | −3.1768E−02 |
| S8 | 2.0615E+01 | −1.4381E+01 | 5.5055E+00 | −8.7587E−01 |
| S9 | 3.6547E+01 | −2.9641E+01 | 1.3544E+01 | −2.6433E+00 |
| S10 | 1.8481E+01 | −1.6208E+01 | 8.3592E+00 | −1.8878E+00 |

Figure 13A:
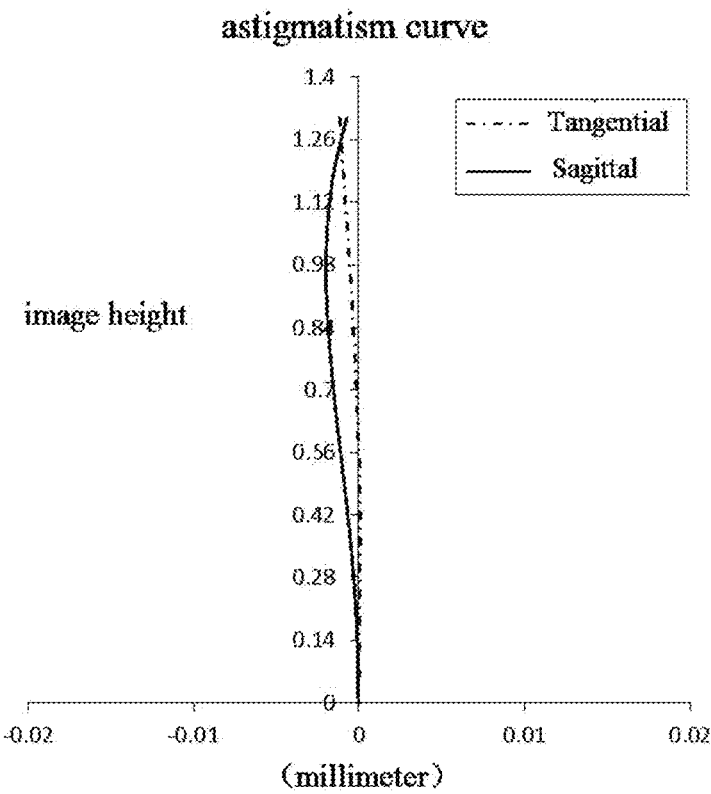
FIGS. 13A-13C show an astigmatism curve, a distortion curve, and a modulation transfer function (MTF) imaging curve of the optical imaging lens group of Embodiment 6 respectively.
Figure 13B:
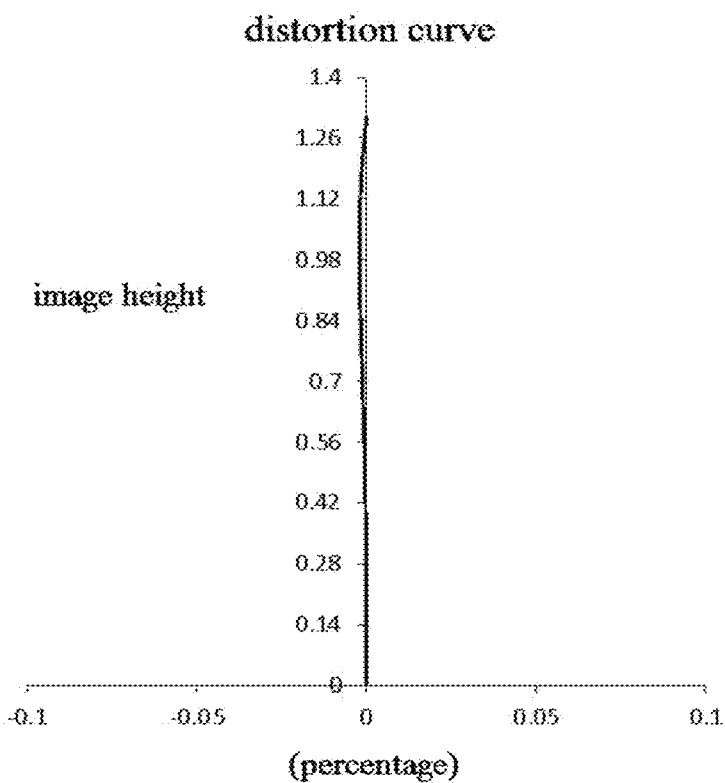
Figure 13C:
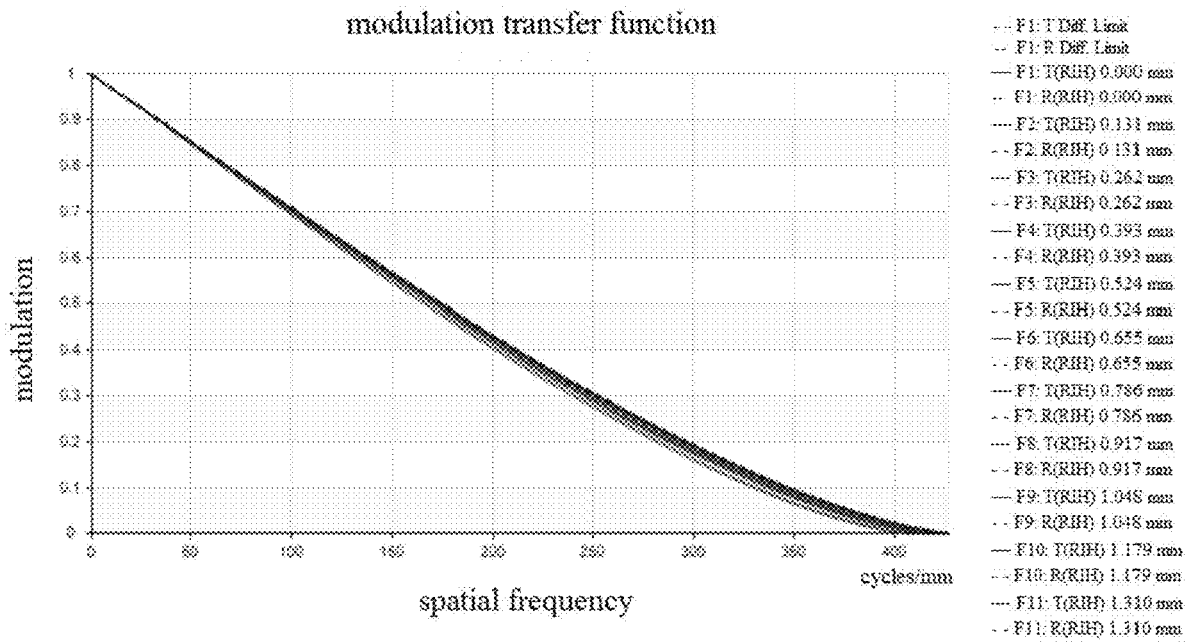

FIG. 13A shows an astigmatism curve of the optical imaging lens group of Embodiment 6, which represents a curvature of tangential image surface and a curvature of sagittal image surface. FIG. 13B shows a distortion curve of the optical imaging lens group of Embodiment 6, which represents distortion magnitude values corresponding to different image heights. FIG. 13C shows a MTF imaging curve of the optical imaging lens group of Embodiment 6, which represents a condition where a modulation degree of the optical imaging lens group varies with spatial frequency. FIGS. 13A-13C show that the optical imaging lens group given in Embodiment 6 is capable of achieving good imaging quality.

Embodiment 7

Figure 14:
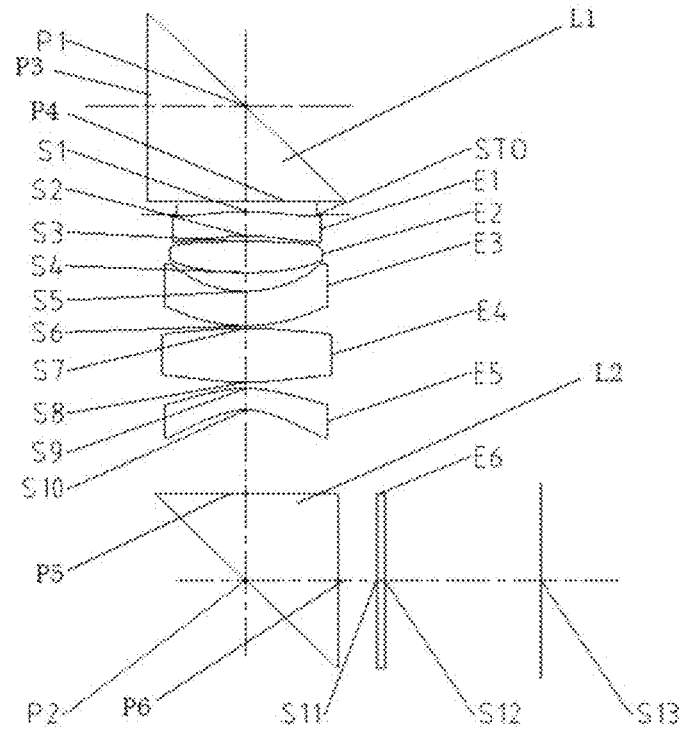
FIG. 14 shows a structural schematic diagram of an optical imaging lens group according to Embodiment 7 of the disclosure.

An optical imaging lens group according to Embodiment 7 of the disclosure is described below with reference to FIGS. 14-15C. FIG. 14 shows a structural schematic diagram of an optical imaging lens group according to Embodiment 7 of the disclosure.

As shown in FIG. 14, the optical imaging lens group sequentially includes, from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.00 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 13 shows a table of basic parameters for the optical imaging lens group of Embodiment 7, wherein the units of the curvature radius, thickness/distance, and focal length are all in millimeters (mm). Table 14 shows higher order term coefficients that may be used for each aspherical mirror surface in Embodiment 7, wherein each aspherical sursurface type can be defined by formula (1) given in Embodiment 1 above.

TABLE 13

| Surface number | Surface type | Curvature radius | Thickness/ distance | Material Refractive index | Abbe number | Focal length | Cone coefficient |
|---|---|---|---|---|---|---|---|
| OBJ | Spherical | Infinity | Infinity | | | | |
| P3 | Spherical | Infinity | 1.3000 | 1.52 | 64.2 | | |
| P1 | Spherical | Infinity | 1.3000 | 1.52 | 64.2 | | |
| P4 | Spherical | Infinity | 0.2079 | | | | |
| STO | Spherical | Infinity | −0.0521 | | | | |
| S1 | Aspherical | 3.1052 | 0.3366 | 1.52 | 64.2 | −50.00 | −18.1952 |
| S2 | Aspherical | 2.6697 | 0.0774 | | | | −42.3076 |
| S3 | Aspherical | 12.2635 | 0.4252 | 1.54 | 56.1 | 6.36 | −75.5618 |
| S4 | Aspherical | −4.7601 | 0.2579 | | | | −3.7115 |
| S5 | Aspherical | −1.4037 | 0.4734 | 1.52 | 64.2 | −10.37 | −0.3557 |
| S6 | Aspherical | −2.1206 | 0.0316 | | | | 0.0620 |
| S7 | Aspherical | 4.2320 | 0.7440 | 1.54 | 56.1 | 3.60 | −71.6109 |
| S8 | Aspherical | −3.4252 | 0.0824 | | | | −44.6481 |
| S9 | Aspherical | 1.4689 | 0.2983 | 1.54 | 55.6 | −4.44 | 0.0397 |
| S10 | Aspherical | 0.8433 | 1.1504 | | | | −0.9864 |
| P5 | Spherical | Infinity | 1.2000 | 1.52 | 64.2 | | |
| P2 | Spherical | Infinity | 1.2000 | 1.52 | 64.2 | | |
| P6 | Spherical | Infinity | 0.5015 | | | | |
| S11 | Spherical | Infinity | 0.1100 | 1.52 | 64.2 | | |
| S12 | Spherical | Infinity | 2.0385 | | | | |
| S13 | Spherical | Infinity | | | | | |

TABLE 14

| Surface number | A4 | A6 | A8 | A10 | A12 |
|---|---|---|---|---|---|
| S1 | 2.3756E−02 | 6.3146E−02 | −6.4686E−01 | 4.3844E+00 | −1.3801E+01 |
| S2 | −7.8369E−02 | 7.4357E−01 | −7.0502E+00 | 3.3702E+01 | −8.5434E+01 |
| S3 | 7.9488E−02 | 1.8670E−01 | −5.5856E+00 | 2.9191E+01 | −7.5763E+01 |
| S4 | 1.8459E−02 | 4.9692E−01 | −2.7593E+00 | 1.0811E+01 | −2.8823E+01 |
| S5 | −1.6609E−01 | 8.6788E−01 | −3.3424E+00 | 1.0499E+01 | −2.4256E+01 |
| S6 | 1.1221E−02 | −1.1801E−01 | 2.5903E−04 | 2.2855E+00 | −7.7022E+00 |
| S7 | 3.7069E−03 | −1.1759E−01 | 1.3131E−01 | 1.5306E+00 | −5.5379E+00 |
| S8 | 9.2994E−02 | −2.0318E−01 | −4.2460E−01 | 3.0276E+00 | −7.6045E+00 |
| S9 | 3.4684E−01 | −1.7308E−01 | −1.2399E+00 | 5.4470E+00 | −1.2248E+01 |
| S10 | 4.8738E−01 | −4.8072E−01 | −2.2615E−01 | 2.3905E+00 | −5.8312E+00 |

| Surface number | A14 | A16 | A18 | A20 |
|---|---|---|---|---|
| S1 | 2.5306E+01 | −2.7906E+01 | 1.7156E+01 | −4.5181E+00 |
| S2 | 1.2421E+02 | −1.0363E+02 | 4.5837E+01 | −8.3073E+00 |
| S3 | 1.0989E+02 | −8.8930E+01 | 3.6627E+01 | −5.7434E+00 |
| S4 | 4.7906E+01 | −4.6941E+01 | 2.4964E+01 | −5.6050E+00 |
| S5 | 3.8467E+01 | −3.8867E+01 | 2.2331E+01 | −5.5409E+00 |
| S6 | 1.2085E+01 | −1.0578E+01 | 5.0525E+00 | −1.0419E+00 |
| S7 | 8.2120E+00 | −6.1984E+00 | 2.3032E+00 | −3.2474E−01 |
| S8 | 1.0769E+01 | −8.8146E+00 | 3.8432E+00 | −6.8611E−01 |
| S9 | 1.7564E+01 | −1.5623E+01 | 7.7033E+00 | −1.5913E+00 |
| S10 | 9.0369E+00 | −9.2144E+00 | 5.4095E+00 | −1.3469E+00 |

Figure 15A:
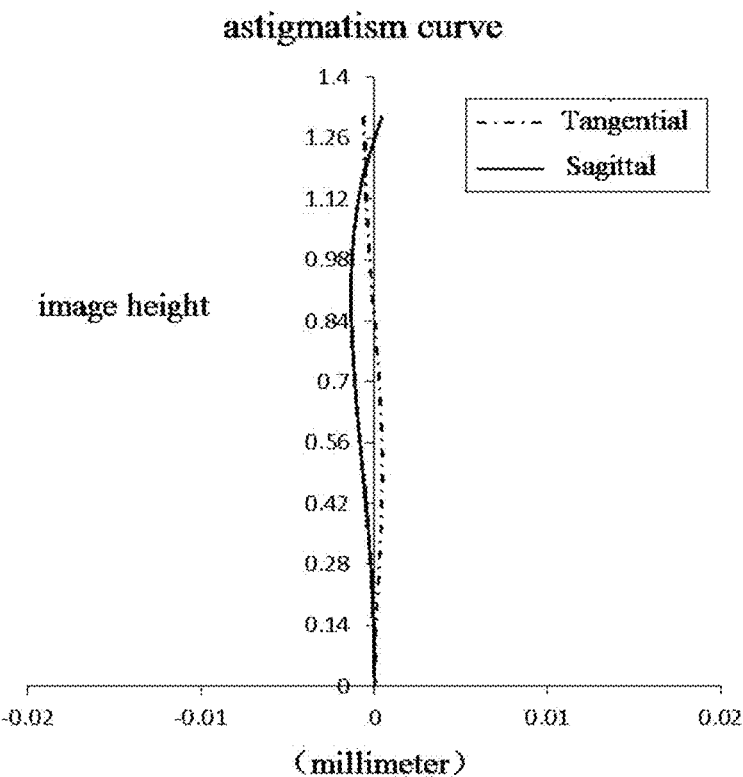
FIGS. 15A-15C show an astigmatism curve, a distortion curve, and a modulation transfer function (MTF) imaging curve of the optical imaging lens group of Embodiment 7 respectively.
Figure 15B:
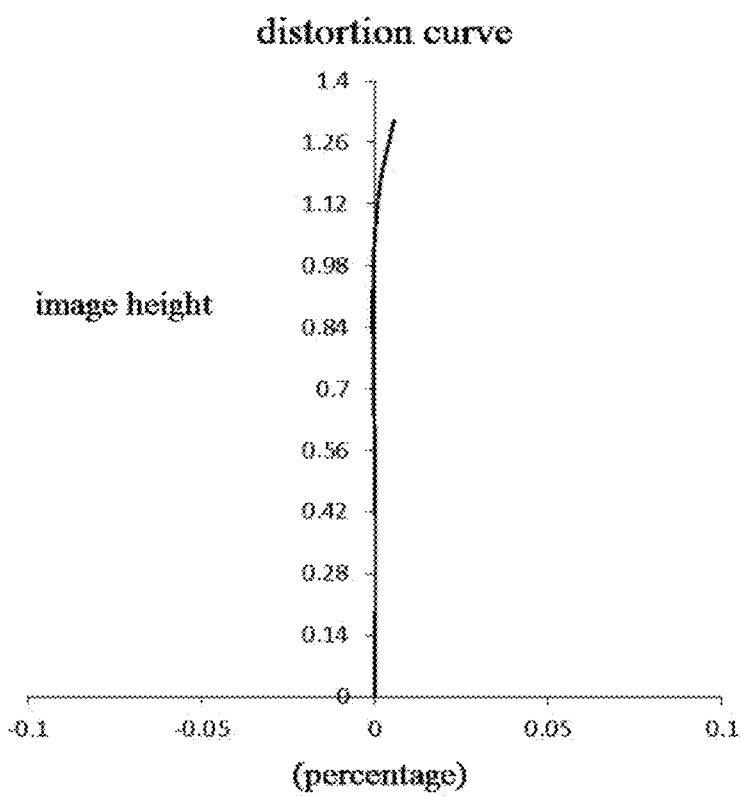
Figure 15C:
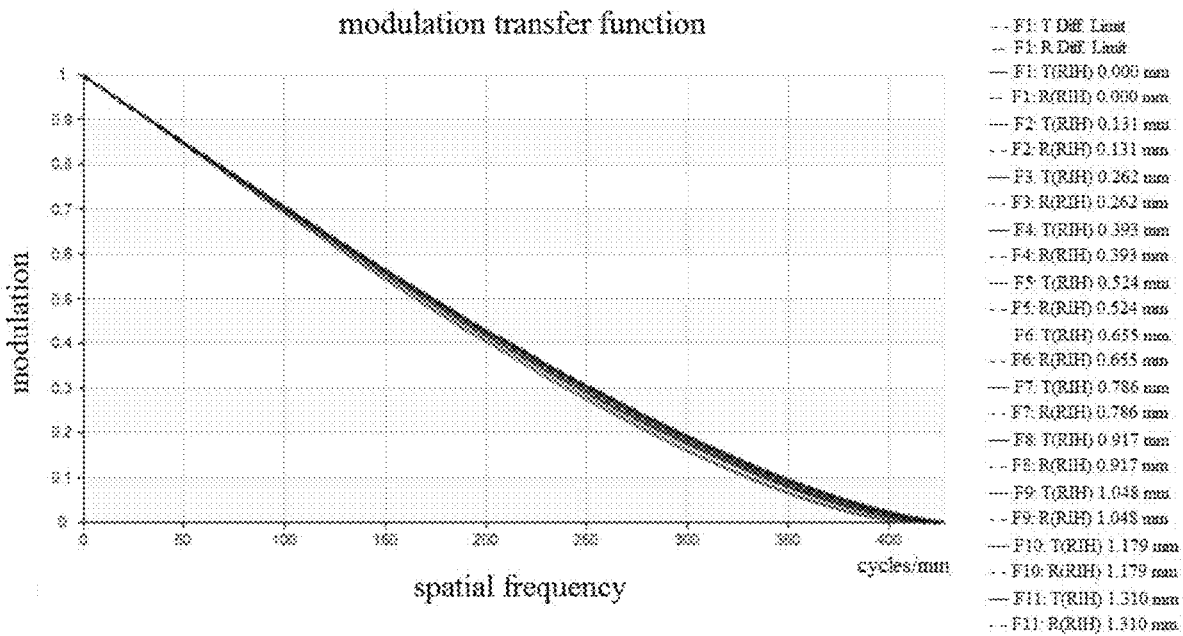

FIG. 15A shows an astigmatism curve of the optical imaging lens group of Embodiment 7, which represents a curvature of tangential image surface and a curvature of sagittal image surface. FIG. 15B shows a distortion curve of the optical imaging lens group of Embodiment 7, which represents distortion magnitude values corresponding to different image heights. FIG. 15C shows a MTF imaging curve of the optical imaging lens group of Embodiment 7, which represents a condition where a modulation degree of the optical imaging lens group varies with spatial frequency. FIGS. 15A-15C show that the optical imaging lens group given in Embodiment 7 is capable of achieving good imaging quality.

Embodiment 8

Figure 16:
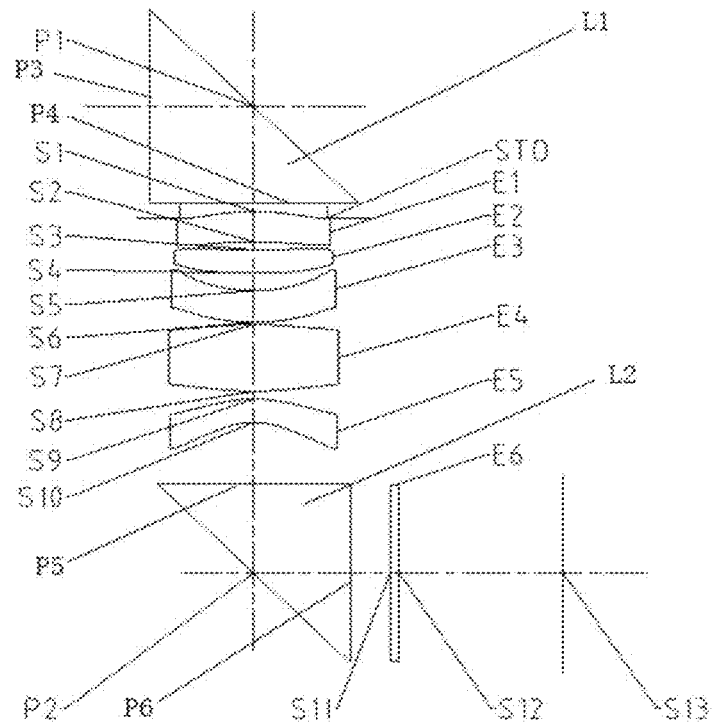
FIG. 16 shows a structural schematic diagram of an optical imaging lens group according to Embodiment 8 of the disclosure.

An optical imaging lens group according to Embodiment 8 of the disclosure is described below with reference to FIGS. 16-17C. FIG. 16 shows a structural schematic diagram of an optical imaging lens group according to Embodiment 8 of the disclosure.

As shown in FIG. 16, the optical imaging lens group sequentially includes, from an object side to an image side: a first prism L1, a diaphragm STO, a first lens E1, a second lens E2, a third lens E3, a fourth lens E4, a fifth lens E5, a second prism L2, an optical filter E6 and an imaging surface S13.

The first prism L1 has a light incident surface P3, a first reflective surface P1, and a light emergent surface P4. The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The second prism L2 has a light incident surface P5, a second reflective surface P2, and a light emergent surface P6. The optical filter E6 has an object-side surface S11 and an image-side surface S12. Light from an object sequentially passes through each of the surfaces from P3 to S12 and is finally imaged on the imaging surface S13.

In the embodiment, a total effective focal length f of the optical imaging lens group is 7.00 mm, Semi-FOV is half of a maximum field of view of the optical imaging lens group and Semi-FOV is 10.6°, ImgH is half of a diagonal length of an effective pixel region on the imaging surface S13 of the optical imaging lens group and ImgH is 1.31 mm, and a ratio f/EPD of the total effective focal length f of the optical imaging lens group to an entrance pupil diameter EPD of the optical imaging lens group is 3.95.

Table 15 shows a table of basic parameters for the optical imaging lens group of Embodiment 8, wherein the units of the curvature radius, thickness/distance, and focal length are all in millimeters (mm). Table 16 shows higher order term coefficients that may be used for each aspherical mirror surface in Embodiment 8, wherein each aspherical surface type can be defined by formula (1) given in Embodiment 1 above.

TABLE 15

| Surface number | Surface type | Curvature radius | Thickness/ distance | Material Refractive index | Abbe number | Focal length | Cone coefficient |
|---|---|---|---|---|---|---|---|
| OBJ | Spherical | Infinity | Infinity | | | | |
| P3 | Spherical | Infinity | 1.3000 | 1.52 | 64.2 | | |
| P1 | Spherical | Infinity | 1.3000 | 1.52 | 64.2 | | |
| P4 | Spherical | Infinity | 0.2079 | | | | |
| STO | Spherical | Infinity | −0.0887 | | | | |
| S1 | Aspherical | 2.6725 | 0.4044 | 1.52 | 64.2 | 12.97 | −8.7362 |
| S2 | Aspherical | 4.2153 | 0.1102 | | | | −81.8155 |
| S3 | Aspherical | −12.9688 | 0.3147 | 1.54 | 56.1 | 37.95 | −78.1372 |
| S4 | Aspherical | −8.0340 | 0.2371 | | | | 0.0000 |
| S5 | Aspherical | −1.7237 | 0.4217 | 1.52 | 64.2 | −12.61 | −0.3833 |
| S6 | Aspherical | −2.5388 | 0.0300 | | | | 0.0000 |
| S7 | Aspherical | 4.1068 | 0.8962 | 1.54 | 56.1 | 3.60 | −75.5525 |
| S8 | Aspherical | −3.4640 | 0.1022 | | | | −47.4828 |
| S9 | Aspherical | 1.4629 | 0.3159 | 1.54 | 55.6 | −4.66 | 0.0000 |
| S10 | Aspherical | 0.8524 | 0.8286 | | | | −1.0000 |
| P5 | Spherical | Infinity | 1.2000 | 1.52 | 64.2 | | |
| P2 | Spherical | Infinity | 1.2000 | 1.52 | 64.2 | | |
| P6 | Spherical | Infinity | 0.4997 | | | | |
| S11 | Spherical | Infinity | 0.1100 | 1.52 | 64.2 | | |
| S12 | Spherical | Infinity | 2.0368 | | | | |
| S13 | Spherical | Infinity | | | | | |

TABLE 16

| Surface number | A4 | A6 | A8 | A10 | A12 |
|---|---|---|---|---|---|
| S1 | −1.3460E−02 | 1.8469E−01 | −1.0586E+00 | 5.0352E+00 | −1.4446E+01 |
| S2 | −1.1942E−01 | 1.3085E+00 | −9.2304E+00 | 3.7042E+01 | −8.5352E+01 |
| S3 | −1.4747E−02 | 1.2511E+00 | −1.2266E+01 | 5.4717E+01 | −1.3625E+02 |

TABLE 16-continued

| | | | | | |
|---|---|---|---|---|---|
| S4 | 6.3713E−02 | 5.3590E−01 | −6.7143E+00 | 3.5652E+01 | −1.0159E+02 |
| S5 | −9.1310E−02 | 1.5652E−01 | −1.8271E+00 | 1.4296E+01 | −4.9670E+01 |
| S6 | −9.0162E−04 | 1.0734E−01 | −1.2110E+00 | 4.9425E+00 | −9.6533E+00 |
| S7 | −4.6420E−02 | 4.5496E−01 | −2.2523E+00 | 5.7066E+00 | −6.2889E+00 |
| S8 | 1.0139E−01 | −1.2705E−01 | −1.2042E+00 | 5.3857E+00 | −1.0398E+01 |
| S9 | 3.5891E−01 | −8.3569E−02 | −2.6217E+00 | 1.1707E+01 | −2.6074E+01 |
| S10 | 4.8984E−01 | −4.3353E−01 | −1.0574E+00 | 7.2722E+00 | −1.9853E+01 |

| Surface number | A14 | A16 | A18 | A20 |
|---|---|---|---|---|
| S1 | 2.6174E+01 | −2.9048E+01 | 1.7963E+01 | −4.7418E+00 |
| S2 | 1.1647E+02 | −9.1996E+01 | 3.8152E+01 | −6.2831E+00 |
| S3 | 1.9905E+02 | −1.6846E+02 | 7.5782E+01 | −1.3865E+01 |
| S4 | 1.6769E+02 | −1.6118E+02 | 8.4076E+01 | −1.8467E+01 |
| S5 | 9.4541E+01 | −1.0323E+02 | 6.0956E+01 | −1.5151E+01 |
| S6 | 1.0566E+01 | −7.1522E+00 | 3.0989E+00 | −7.0812E−01 |
| S7 | −1.4292E−01 | 6.8024E+00 | −5.8077E+00 | 1.5757E+00 |
| S8 | 1.0630E+01 | −5.4625E+00 | 9.9380E−01 | 7.8897E−02 |
| S9 | 3.4050E+01 | −2.6167E+01 | 1.0960E+01 | −1.9355E+00 |
| S10 | 3.1257E+01 | −2.9036E+01 | 1.4778E+01 | −3.1866E+00 |

Figure 17A:
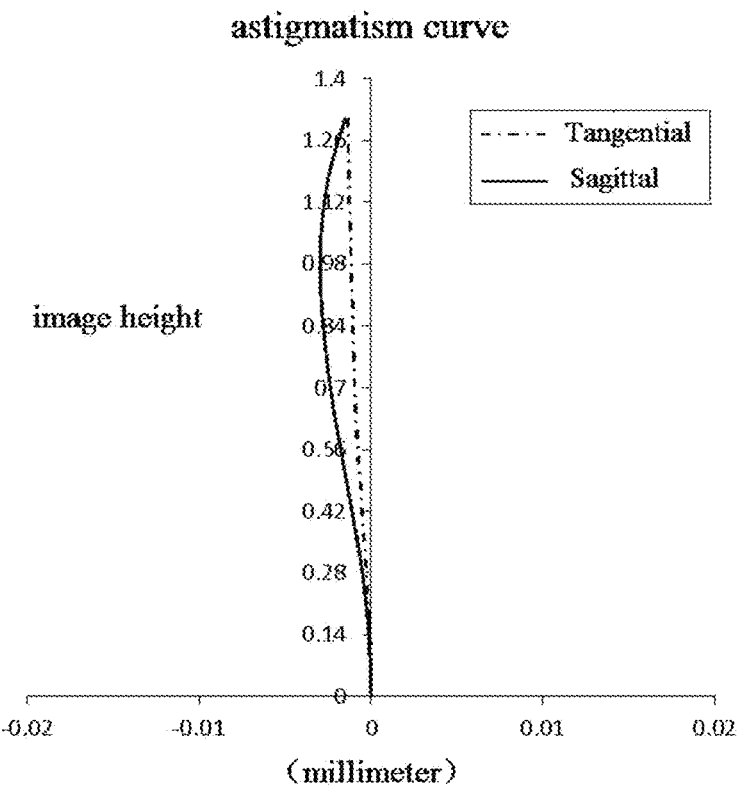
FIGS. 17A-17C show an astigmatism curve, a distortion curve, and a modulation transfer function (MTF) imaging curve of the optical imaging lens group of Embodiment 8 respectively.
Figure 17B:
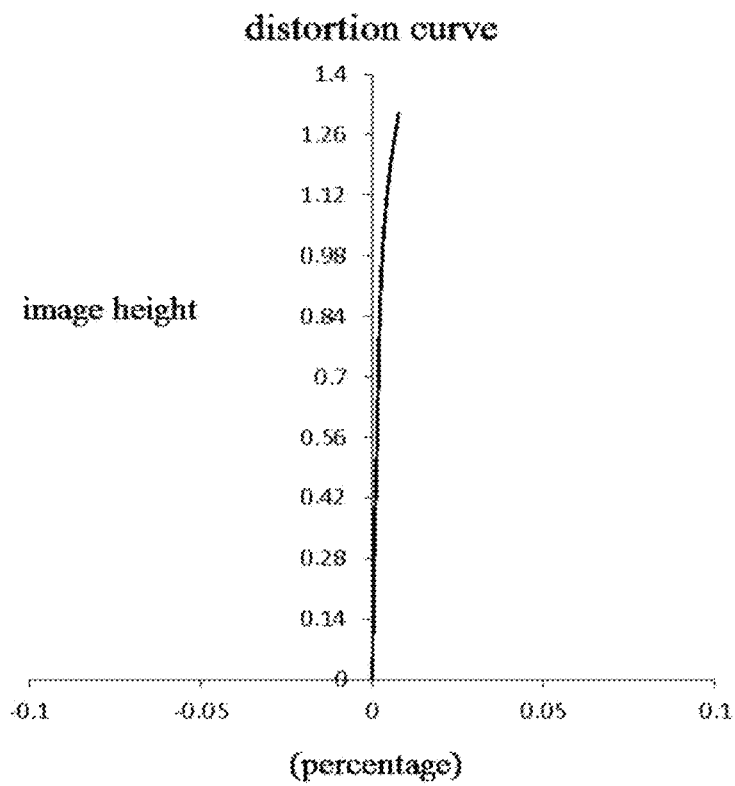
Figure 17C:
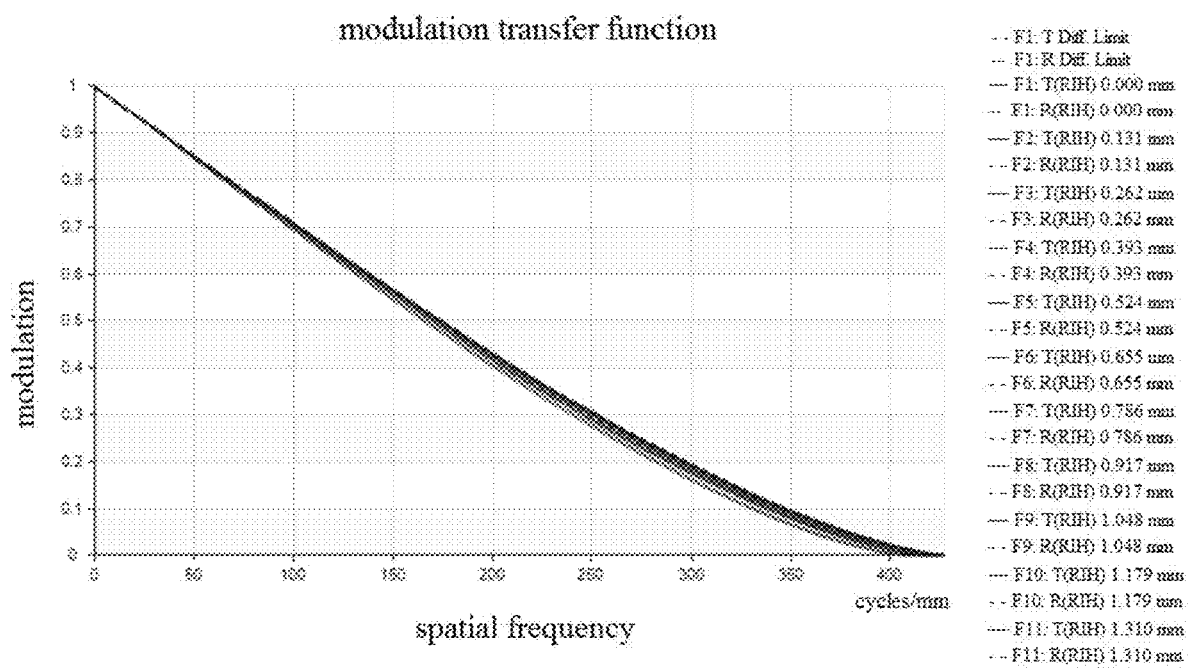

FIG. 17A shows an astigmatism curve of the optical imaging lens group of Embodiment 8, which represents a curvature of tangential image surface and a curvature of sagittal image surface. FIG. 17B shows a distortion curve of the optical imaging lens group of Embodiment 8, which represents distortion magnitude values corresponding to different image heights. FIG. 17C shows an MTF imaging curve of the optical imaging lens group of Embodiment 8, which represents a condition where a modulation degree of the optical imaging lens group varies with spatial frequency. FIGS. 17A-17C show that the optical imaging lens group given in Embodiment 8 is capable of achieving good imaging quality.

To summarize, Embodiments 1-8 separately satisfy relationships shown in Table 17.

TABLE 17

| | Embodiments | | | | | | | |
|---|---|---|---|---|---|---|---|---|
| Conditional expression | 1 | 2 | 3 | 4 | 5 | 6 | 7 | 8 |
| \|Dist.\| | 0.011 | 0.011 | 0.007 | 0.010 | 0.007 | 0.002 | 0.005 | 0.008 |
| f34 * tan (Semi-FOV) (mm) | −0.71 | −0.73 | −0.79 | −0.59 | −0.89 | −1.16 | −0.85 | −0.82 |
| f4/f12 | −0.23 | −0.23 | −0.41 | −0.22 | −0.57 | −0.62 | −0.48 | −0.36 |
| R1/f | 0.31 | 0.30 | 0.45 | 0.35 | 0.35 | 0.48 | 0.44 | 0.38 |
| (R9 + R10)/f5 | −0.50 | −0.49 | −0.57 | −0.66 | −0.47 | −0.34 | −0.52 | −0.50 |
| SAG32/SAG52 | −0.62 | −0.62 | −0.75 | −0.80 | −0.87 | −0.97 | −0.70 | −0.57 |
| ET1/ET3 | 0.71 | 0.70 | 0.57 | 0.66 | 0.50 | 0.45 | 0.63 | 0.72 |
| ET5/(ET4 + ET5) | 0.37 | 0.41 | 0.41 | 0.46 | 0.66 | 0.45 | 0.44 | 0.38 |
| R5/R6 | 0.82 | 0.77 | 0.70 | 0.96 | 0.81 | 0.71 | 0.66 | 0.68 |
| (CT2 + CT4)/(CT1 + CT3 + CT5) | 1.26 | 1.13 | 1.02 | 1.01 | 0.60 | 0.92 | 1.05 | 1.06 |
| T12/T23 | 0.38 | 0.34 | 0.31 | 0.30 | 0.28 | 0.29 | 0.30 | 0.46 |

The disclosure also provides an imaging device, wherein the electronic photosensitive element can be a Charge Coupled Device (CCD) or a Complementary Metal Oxide Semiconductor (CMOS). The imaging device may be a stand-alone imaging device, such as a digital camera, or an imaging module integrated on mobile electronic equipment, such as a cell phone. The imaging device is equipped with the optical imaging lens group described above.

The above description is only description about the preferred embodiments of the disclosure and adopted technical principles. Those skilled in the art should know that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. An optical imaging lens group, sequentially comprising from an object side to an image side along an optical axis:
   a first prism has a first reflective surface;
   a first lens has a refractive power, and an object-side surface thereof is a convex surface;
   a second lens has a refractive power;
   a third lens has a refractive power, an object-side surface thereof is a concave surface and an image-side surface thereof is a convex surface;
   a fourth lens has a refractive power;
   a fifth lens has a refractive power; and
   a second prism has a second reflective surface; and
   an optical distortion Dist. of the optical imaging lens group satisfies: |Dist.|<0.1%;
   a combined focal length f12 of the first lens and the second lens and an effective focal length f4 of the fourth lens satisfy: −0.7<f4/f12<−0.2.

2. The optical imaging lens group according to claim 1, wherein Semi-FOV is half of a maximum field of view of the optical imaging lens group, Semi-FOV and a combined focal length f34 of the third lens and the fourth lens satisfy: $-1.3 \text{ mm} < f34*\tan(\text{Semi-FOV}) < -0.3 \text{ mm}$.

3. The optical imaging lens group according to claim 1, wherein a curvature radius R1 of the object-side surface of the first lens and a total effective focal length f of the optical imaging lens group satisfy: $0.2 < R1/f < 0.7$.

4. The optical imaging lens group according to claim 1, wherein a curvature radius R9 of an object-side surface of the fifth lens, a curvature radius R10 of an image-side surface of the fifth lens, and an effective focal length f5 of the fifth lens satisfy: $-0.7 < (R9+R10)/f5 < -0.2$.

5. The optical imaging lens group according to claim 1, wherein SAG32 is a distance from an intersection point of the image-side surface of the third lens and the optical axis to an effective radius vertex of the image-side surface of the third lens on the optical axis, and SAG52 is a distance from an intersection point of an image-side surface of the fifth lens and the optical axis to an effective radius vertex of the image-side surface of the fifth lens on the optical axis, SAG32 and SAG52 satisfy: $-1.0 < \text{SAG32}/\text{SAG52} < -0.5$.

6. The optical imaging lens group according to claim 1, wherein an edge thickness ET1 of the first lens and an edge thickness ET3 of the third lens satisfy: $0.3 < \text{ET1}/\text{ET3} < 0.8$.

7. The optical imaging lens group according to claim 1, wherein an edge thickness ET4 of the fourth lens and an edge thickness ET5 of the fifth lens satisfy: $0.3 < \text{ET5}/(\text{ET4}+\text{ET5}) < 0.8$.

8. The optical imaging lens group according to claim 1, wherein a curvature radius R5 of the object-side surface of the third lens and a curvature radius R6 of the image-side surface of the third lens satisfy: $0.5 < R5/R6 < 1.0$.

9. The optical imaging lens group according to claim 1, wherein a center thickness CT1 of the first lens on the optical axis, a center thickness CT2 of the second lens on the optical axis, a center thickness CT3 of the third lens on the optical axis, a center thickness CT4 of the fourth lens on the optical axis, and a center thickness CT5 of the fifth lens on the optical axis satisfy: $0.5 < (\text{CT2}+\text{CT4})/(\text{CT1}+\text{CT3}+\text{CT5}) < 1.5$.

10. The optical imaging lens group according to claim 1, wherein a spacing distance T12 between the first lens and the second lens on the optical axis and a spacing distance T23 between the second lens and the third lens on the optical axis satisfy: $0.2 < \text{T12}/\text{T23} < 0.7$.

11. The optical imaging lens group according to claim 1, wherein the fourth lens has a positive refractive power.

12. The optical imaging lens group according to claim 1, wherein the fifth lens has a negative refractive power, an object-side surface thereof is a convex surface, and an image-side surface thereof is a concave surface.

13. An optical imaging lens group, sequentially comprising from an object side to an image side along an optical axis:
   a first prism has a first reflective surface;
   a first lens has a refractive power;
   a second lens has a refractive power;
   a third lens has a refractive power;
   a fourth lens has a positive refractive power;
   a fifth lens has a negative refractive power, an object-side surface thereof is a convex surface and an image-side surface thereof is a concave surface; and
   a second prism has a second reflective surface; and
   an optical distortion Dist. of the optical imaging lens group satisfies: $|\text{Dist.}| < 0.1\%$;
   a combined focal length f12 of the first lens and the second lens and an effective focal length f4 of the fourth lens satisfy: $-0.7 < f4/f12 < -0.2$.

14. The optical imaging lens group according to claim 13, wherein Semi-FOV is half of a maximum field of view of the optical imaging lens group, Semi-FOV and a combined focal length f34 of the third lens and the fourth lens satisfy: $-1.3 \text{ mm} < f34*\tan(\text{Semi-FOV}) < -0.3 \text{ mm}$.

15. The optical imaging lens group according to claim 13, wherein a curvature radius R1 of the object-side surface of the first lens and a total effective focal length f of the optical imaging lens group satisfy: $0.2 < R1/f < 0.7$.

16. The optical imaging lens group according to claim 13, wherein a curvature radius R9 of an object-side surface of the fifth lens, a curvature radius R10 of an image-side surface of the fifth lens, and an effective focal length f5 of the fifth lens satisfy: $-0.7 < (R9+R10)/f5 < -0.2$.

17. The optical imaging lens group according to claim 13, wherein SAG32 is a distance from an intersection point of an image-side surface of the third lens and the optical axis to an effective radius vertex of the image-side surface of the third lens on the optical axis, and SAG52 is a distance from an intersection point of the image-side surface of the fifth lens and the optical axis to an effective radius vertex of the image-side surface of the fifth lens on the optical axis, SAG32 and SAG52 satisfy: $-1.0 < \text{SAG32}/\text{SAG52} < -0.5$.

18. The optical imaging lens group according to claim 13, wherein an edge thickness ET1 of the first lens and an edge thickness ET3 of the third lens satisfy: $0.3 < \text{ET1}/\text{ET3} < 0.8$.

* * * * *